(12) United States Patent
Yamada et al.

(10) Patent No.: US 7,245,580 B2
(45) Date of Patent: Jul. 17, 2007

(54) OPTICAL RECORDING MEDIUM HAVING PROTECTIVE AND/OR ADHESIVE LAYERS, AND METHOD OF MANUFACTURE

(75) Inventors: Katsuyuki Yamada, Zama (JP); Yuki Nakamura, Zama (JP); Shinya Narumi, Yokohama (JP); Masaki Kato, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 281 days.

(21) Appl. No.: 10/384,452

(22) Filed: Mar. 7, 2003

(65) Prior Publication Data

US 2003/0214902 A1 Nov. 20, 2003

(30) Foreign Application Priority Data

| | | | |
|---|---|---|---|
| Mar. 7, 2002 | (JP) | | 2002-062608 |
| Mar. 18, 2002 | (JP) | | 2002-075052 |
| Mar. 27, 2002 | (JP) | | 2002-089736 |

(51) Int. Cl.
*G11B 7/24* (2006.01)
(52) U.S. Cl. ............... 369/275.5; 369/283; 428/64.4
(58) Field of Classification Search ............ None
See application file for complete search history.

(56) References Cited

U.S. PATENT DOCUMENTS

| | | | | |
|---|---|---|---|---|
| 4,709,363 A | * | 11/1987 | Dirks et al. ............ 369/275.1 |
| 5,736,657 A | | 4/1998 | Ide et al. ............... 75/230 |
| 5,923,639 A | * | 7/1999 | Yasuda et al. ......... 369/275.2 |
| 5,974,025 A | | 10/1999 | Yamada et al. ........... 369/288 |
| 6,007,889 A | | 12/1999 | Nee |
| 6,159,573 A | | 12/2000 | Zhou |
| 6,280,810 B1 | | 8/2001 | Nakamura et al. ........ 428/64.1 |
| 6,280,811 B1 | | 8/2001 | Nee |
| 6,319,368 B1 | | 11/2001 | Ide et al. ............... 204/192.26 |
| 6,329,035 B1 | * | 12/2001 | Iwasaki et al. ........... 428/64.1 |
| 6,373,802 B1 | | 4/2002 | Hattori et al. ........... 369/53.27 |
| 6,388,978 B1 | | 5/2002 | Ogawa et al. ........... 369/116 |
| 6,445,669 B1 | | 9/2002 | Hattori et al. ........... 369/116 |

(Continued)

FOREIGN PATENT DOCUMENTS

EP 0 594 516 A2 4/1994

(Continued)

OTHER PUBLICATIONS

U.S. Appl. No. 10/062,912, filed Jan. 31, 2002, claims, abstract, drawings.

(Continued)

*Primary Examiner*—Tan Dinh
(74) *Attorney, Agent, or Firm*—Cooper & Dunham LLP

(57) ABSTRACT

An optical recording medium including a substrate having guide groove thereon; a first protective layer located overlying the substrate; a recording layer located overlying the first protective layer; a second protective layer located overlying the recording layer; a third protective layer of from 2 to 9 nm thick located overlying the second protective layer and comprising Si in an amount not less than 35 atomic percent; and a reflection layer including Ag in an amount not less than 95% by weight. An overcoat layer having a glass transition temperature of from 90° C. to 180° C. is preferably formed overlying the reflection layer. A method for manufacturing the optical recording medium is also provided.

33 Claims, 7 Drawing Sheets

U.S. PATENT DOCUMENTS

| | | | |
|---|---|---|---|
| 6,487,152 B1 | 11/2002 | Nakamura | 369/47.53 |
| 6,544,616 B2 | 4/2003 | Nee | |
| 6,660,452 B2 * | 12/2003 | Iwasaki et al. | 430/270.13 |
| 6,716,507 B2 * | 4/2004 | Tabata | 428/64.1 |
| 6,764,735 B2 | 7/2004 | Nee | |
| 2001/0017833 A1 | 8/2001 | Yamada et al. | 369/59.11 |
| 2002/0075789 A1 | 6/2002 | Katoh et al. | 369/272 |
| 2002/0110063 A1* | 8/2002 | Yamada et al. | 369/275.5 |
| 2002/0145963 A1 | 10/2002 | Narumi et al. | 369/59.11 |
| 2002/0155248 A1 | 10/2002 | Ito et al. | 428/66.4 |
| 2003/0008236 A1 | 1/2003 | Yamada et al. | 430/270.13 |
| 2003/0026195 A1 | 2/2003 | Kato | 369/275.3 |

FOREIGN PATENT DOCUMENTS

| | | | |
|---|---|---|---|
| JP | 03-58334 A | 3/1991 | |
| JP | 06-208732 A | 7/1994 | |
| JP | 7-105575 | 4/1995 | |
| JP | 08-069636 | 3/1996 | |
| JP | 9-293271 | * 11/1997 | 369/275.1 |
| JP | 10-011799 | 1/1998 | |
| JP | 2749080 | 2/1998 | |
| JP | 10-177742 A | 6/1998 | |
| JP | 10-269626 A | 10/1998 | |
| JP | 11238253 | 8/1999 | |
| JP | 2000331378 | 11/2000 | |
| JP | 2002-46356 A | 2/2002 | |

OTHER PUBLICATIONS

U.S. Appl. No. 10/044,490, filed Jan. 9, 2002, claims, abstract, drawings.

U.S. Appl. No. 09/863,472, filed May 24, 2001, claims, abstract, drawings.

U.S. Appl. No. 09/795,436, filed Mar. 1, 2001, claims, abstract, drawings.

U.S. Appl. No. 09/793,131, filed Feb. 27, 2001, claims, abstract, drawings.

U.S. Appl. No. 09/585,380, filed May 31, 2000, claims, abstract, drawings.

U.S. Appl. No. 09/569,501, May 11, 2000, claims, abstract, drawings.

* cited by examiner

OPTICAL RECORDING MEDIUM HAVING PROTECTIVE AND/OR ADHESIVE LAYERS, AND METHOD OF MANUFACTURE

BACKGROUND OF THE INVENTION

1. Field of the Invention

The present invention relates to an optical recording medium in which information can be recorded using laser light and the recorded information can be reproduced using laser light, such as CD-DAs, CD-Rs, CD-RWs, DVD-VIDEOs, DVD-ROMs, DVD-Rs, DVD-RWs, DVD+Rs, DVD+RWs and DVD-RAMs. Particularly, the present invention relates to a high speed optical recording medium in which information can be recorded at a high speed not lower than 12 m/sec.

2. Discussion of the Related Art

Various optical recording media, in which information can be recorded or reproduced with laser light, such as CD-DAs, CD-ROMs, VIDEO-CDs, CD-Rs, CD-RWs, DVD-VIDEOs, DVD-ROMs, DVD-Rs, DVD-RWs, DVD+Rs, DVD+RWs and DVD-RAMs have been commercialized. Needs such as higher density information recording and higher speed information recording exist for these optical recording media to record a large amount of information at a high speed. Recently, a Ag-based reflection layer has been investigated to provide such a high density and high speed recording medium.

Recording media having a Ag-based reflection layer have the following advantages:
(1) the resultant recording media have increased reflectance over a wide wavelength region, resulting in increase of reproduction ability of the recording media;
(2) the amplitude of recorded signals increases because silver has good optical properties, resulting in increase of reproduction ability of the recording media;
(3) in the case of phase change optical recording media, the reflection layer has relatively high cooling speed, resulting in improvement of the overwriting ability of the recording media;
(4) in the case of phase change optical recording media, the reflection layer has relatively high cooling speed, resulting in widening of the recordable speed range of the recording media;
(5) the resultant recording media have improved productivity because the Ag-based reflection layer has high sputtering efficiency; and
(6) the heat stress applied to the recording media can be decreased because the sputtering time can be reduced, resulting in improvement of mechanical properties of the recording media.

When silver is used for a reflection layer, however, the resultant reflection layer has the following drawbacks:
(1) the reflection layer tends to be corroded under high temperature and high humidity conditions;
(2) the reflection layer tends to be easily corroded by sulfur and chlorine;
(3) the reflection layer has poor adhesion to the layer on which the reflection layer is located; and
(4) silver is a noble metal and therefore the reflection layer has a relatively high cost compared to an aluminum reflection layer.

In attempting to prevent silver from being corroded, Unexamined Japanese Patent Application No. (hereinafter referred to as simply JP-A) 57-186244 (i.e., U.S. Pat. No. 4,709,363) discloses a AgCu reflection layer. In addition, AgMg-based, AgOM-based and AgPdCu-based reflection layers have been disclosed in JP-As 7-3363, 9-156224 and 2000-285517. Further, Japanese Patent No. 2749080 discloses a Ag-based reflection layer in which one or more elements such as Ti, V, Fe, Co, Ni, Zn, Zr, Nb, Mo, Rh, Pd, Sn, Sb, Te, Ta, W, Ir, Pt, Pb, Bi and C are included.

When the present inventors prepared a DVD+R disc and a DVD+RW disc using such materials as a reflection layer to evaluate the archival preservation property thereof at 80° C. and 85% RH, the resultant discs have poor preservation reliability because a reproduction error problem suddenly increases after a 300-hour preservation test.

In attempting to prevent a reflection layer from being corroded, methods in which an ultraviolet crosslinking resin layer is formed on a reflection layer have been conventionally proposed. For example, JP-A 2001-222842 discloses a method in which a resin layer having a glass transition temperature not lower than 45° C. is formed on an Al reflection layer to prevent water absorption of the resin layer, resulting in prevention of wrinkling of the resin layer, and thereby corrosion of the Al reflection layer can be prevented. When the present inventors prepared a recording medium in which the resin having a glass transition temperature of 80° C. which is disclosed in JP-A 2001-222842 is formed on a Ag-based reflection layer, the reflection layer of the resultant recording medium was corroded and thereby a reproduction error problem increases.

In addition, it is known that a $ZnS.SiO_2$ (80/20 by mole) layer is formed on and under a reflection layer to prevent corrosion of the reflection layer. In this case, a $ZnS.SiO_2$ layer having optimized thermal expansion coefficient, optical constant and elastic modulus is used.

However, it is known that when a Ag-based reflection layer is formed on the $ZnS.SiO_2$ layer to prepare a high speed recording phase change optical recording medium, a problem in that the reflection layer is corroded due to reaction of Ag with $ZnS.SiO_2$.

In attempting to solve the problem, JP-A 11-238253 discloses a method in which an intermediate layer using a material such as Ta, Ni, Co, Cr, Si, W, V, C, Si, Au, Pd, Ag oxides, Al oxides and Ta oxides is formed to prevent the Ag-based reflection layer from reacting with sulfur included in the protective layer adjacent to the reflection layer. It is also disclosed therein that the thickness of the intermediate layer is preferably 40 nm to utilize the high heat conductivity of the Ag-based reflection layer while preventing corrosion of the reflection layer. In addition, it is disclosed that when the intermediate layer has a thickness of from 10 to 50 nm, the resultant medium has good signal properties, and good preservation reliability at 80° C. and 85% RH.

However, when the present inventors prepared phase change optical recording media having such an intermediate layer having a thickness of from 10 to 50 nm, the signal properties of the resultant recording media largely depended on the thickness of the intermediate layer, and thereby the recording media could not have practical signal properties. In addition, when the recording media were subjected to a heat cycle test 6 times in which a cycle of preservation at 25° C. and 95% RH for 12 hours, followed by preservation at 40° C. and 95% RH for 12 hours was repeated while the recording media were heated and cooled at a heating or cooling speed of 10° C./hour when the temperature was increased or decreased. As a result, a problem in that the Ag-based reflection layer is peeled from the intermediate layer occurred.

Namely, according to the present inventors' investigation, it is found that the reaction of silver in the reflection layer with sulfur in the protective layer can be prevented but the adhesion of the intermediate layer to the Ag-based reflection layer is poor, and thereby adhesion between both the layers deteriorates when the recording media are preserved under high humidity conditions or dew condensation occurs. The reason is considered to be that by forming a chemically inactive intermediate layer to prevent diffusion of elements included in one of the layers to the other layer and to prevent corrosion of the Ag-based reflection layer, deterioration of adhesion of the intermediate layer to the Ag-based reflection layer cannot be prevented particularly under high humidity conditions.

The present inventors disclose in JP-A 2000-331378 that an element such as AlN, SiNx, SiAlN, TiN, BN, TAN, $Al_2O_3$, MgO, SiO, $TiO_2$, $B_2O_3$, $CeO_2$, CaO, $Ta_2O_5$, ZnO, $In_2O_3$, $SnO_2$, WC, MoC, TiC and SiC is used in an upper dielectric protective layer adjacent to a reflection layer, wherein the upper dielectric protective layer may have a multi-layered structure, and wherein the upper dielectric protective layers (i.e., the second and third protective layers 4 and 5 in FIG. 1) preferably have a total thickness of from 7 nm to 60 nm, and more preferably from 10 nm to 30 nm.

However, there is no embodiment therein, in which the thickness of the second upper dielectric protective layer (i.e., the third protective layer 5 in FIG. 1) is 9 nm or less (there is only an embodiment therein in which the thickness of the second upper dielectric protective layer is 10 nm). In addition, there is no technical idea therein such that in order to dramatically improve the reliability of a Ag-based reflection layer without widely changing the optical and thermal properties of the recording medium and in order to prevent corrosion of silver in the reflection layer without adversely affecting the function of the first protective layer (i.e., the second protective layer 4 in FIG. 1), a thin surface-modified layer is formed as the second protective layer (i.e., the third protective layer 5 in FIG. 1) contacting the reflection layer.

As mentioned below, when a material including Si in an amount not less than 35 atomic percent is used for the protective layer (i.e., the third protective layer 5 in FIG. 1) contacting the reflection layer, the initial signal properties and the reliability under high humidity conditions of 95% RH of the resultant recording medium deteriorate if the thickness of the protective layer is not less than 10 nm (this can be easily understood from the evaluation results of Comparative Examples 3 to 7 mentioned later). In addition, when a third protective layer including a material other than the materials including Si in an amount not less than 35 atomic percent such as SiO and SiC (the material is considered to be equivalent to the materials including Si in an amount not less than 35 atomic percent in JP-A 2000-331378) and having a thickness not greater than 9 nm is formed, the resultant recording medium cannot produce the same effects as those of the recording medium of the present invention (this can be understood from the evaluation results of Examples 1 to 16 in Table 1).

Namely, JP-A 2000-331378 does not disclose nor suggest that among the materials for use in the upper protective layer disclosed therein, only the materials including Si in an amount not less than 35 atomic percent can produce excellent effects.

Accordingly, although it is disclosed in JP-As 11-238253 and 2000-331378 to use Si or a material including Si for the intermediate layer or dielectric protective layer, such materials are considered to be equivalent to materials which are considered to be comparative materials in the present application. Namely, it is not disclosed nor suggested therein that only the materials including Si in an amount not less than 35 tomic percent can produce excellent effects. In addition, since the thickness of the protective layer is greater than the preferable range (i.e., from 2 nm to 9 nm) in the present invention, the object of the present invention cannot be attained. Namely, it is clear that the technical idea of the present invention is not disclosed therein.

Further, the above-mentioned patent applications have never disclosed preferable sputtering conditions of the intermediate layer or dielectric protective layer including Si, preferable structures and film properties of the resultant layer, which depend on the sputtering conditions, and preferable layer thickness which is determined such that a good combination of the environmental reliability and signal properties can be imparted to the recording medium.

Because of these reasons, a need exists for an optical recording medium which has good preservation reliability even under high temperature/high humidity conditions, good high temperature operation stability, good mechanical properties, and good productivity and which can perform high speed recording and reproduction.

SUMMARY OF THE INVENTION

Accordingly, an object of the present invention is to provide an optical recording medium which has good preservation reliability even under high temperature/high humidity conditions, good high temperature operation stability, good mechanical properties and good productivity and which can perform high speed recording and reproduction.

Another object of the present invention is to provide an optical recording medium which has good high-temperature operability, good preservation reliability, good mechanical properties and high productivity and which can perform high speed recording and reproducing.

To achieve such objects, the present invention contemplates the provision of an optical recording medium which includes a first protective layer, a recording layer, a second protective layer, a third protective layer including a material including Si in an amount not less than 35 atomic percent and having a thickness of from 2 nm to 9 nm, a reflection layer including Ag in an amount not less than 95% by weight, and a resin protective layer (i.e., an overcoat layer) and/or an adhesive layer, which layers are overlaid in this order on a substrate having a guide groove.

The thickness of the third protective layer is preferably from 3 nm to 7 nm.

It is preferable that the third protective layer consists essentially of Si.

Alternatively, it is also preferable that the third protective layer includes Si, C and O, for example, a mixture of SiC and SiOx, and a mixture of C, SiC and SiOx, wherein x is a number of from 1 to 2.

When oxygen is included in the third protective layer, the content of oxygen therein is preferably from 1 to 20% by atom.

The optical recording medium preferably satisfies the following relationships:

$$0.1 \leq DM/D2 \leq 0.5, \text{ and } 0.01 \leq DM/DR \leq 0.1,$$

and more preferably the following relationships:

$$0.15 \leq DM/D2 \leq 0.35, \text{ and } 0.03 \leq DM/DR \leq 0.05,$$

wherein D2 represents the thickness of the second protective layer, DM represents the thickness of the third protective layer, DR represents the thickness of the reflection layer.

In addition, the optical recording medium preferably satisfies the following relationship:

$$En(\text{ave}) = (\Sigma[mi \times Eni])/100 \leq 2.3,$$

wherein En (ave) represents the average electronegativity of the third protective layer, and mi and Eni represent the atomic percent and electronegativity of each of the constituent elements of the third protective layer.

The overcoat layer and/or the adhesive layer located overlying the reflection layer preferably have a glass transition temperature of from 90° C. to 180° C., and more preferably from 100° C. to 165° C.

It is preferable that the overcoat layer and the adhesive layer are located overlying the reflection layer, and the difference in glass transition temperature of the overcoat layer and the adhesive layer is not greater than 50° C. The glass transition temperature difference is more preferably not greater than 30° C.

The reflection layer preferably includes Ag and an element selected from the group consisting of Al, Bi, Ca, Cu, Cd, Fe, Mn, Mg, Ni, Pd, Pb, Sb, Zn and Nd. More preferably, the element is Cu or Nd.

It is more preferable that the reflection layer includes Ag and Cu, wherein the content of Cu is from 0.1% by weight to 5% by weight.

The groove formed on the substrate preferably has a width of from 0.10 µm to 0.40 µm (more preferably from 0.15 µm to 0.35 µm) and a depth of from 15 to 45 nm (more preferably from 20 nm to 40 nm) when the recording medium is used as a DVD-ROM compatible rewritable optical recording medium. The groove formed on the substrate preferably has a width of from 0.25 µm to 0.65 µm (more preferably from 0.30 µm to 0.60 µm) and a depth of from 20 nm to 50 nm (more preferably from 25 nm to 45 nm) when the recording medium is used as a CD-RW compatible rewritable optical recording medium).

The optical recording medium preferably satisfies the following relationships:

$$0.02 \leq Rm/Rr \leq 0.20, \text{ and } 0.5 \text{ nm/sec} \leq Rm \leq 5.0 \text{ nm/sec},$$

wherein Rm represents the film forming speed of the third protective layer and Rr represents the film forming speed of the reflection layer when the reflection layer is prepared.

The optical recording medium preferably satisfies the following relationship:

$$1.5 \times Pm \leq Pr,$$

wherein Pm represents the sputtering power applied for forming the third protective layer, and Pr represents the sputtering power applied for forming the reflection layer.

The recording layer preferably has a formula $Ag_{\alpha 1}Ge_{\alpha 2}In_{\beta 1}Ga_{\beta 2}Bi_{\beta 3}Sb_\gamma Te_\delta M_\epsilon$, wherein total of $\alpha 1+\alpha 2+\beta 1+\beta 2+\beta 3+\gamma+\delta+\epsilon=100$ atomic percent, and wherein $0 \leq \alpha 1 \leq 10$, $0 \leq \alpha 2 \leq 10$, $0.1 \leq \alpha 1+\alpha 2 \leq 10$, $0 \leq \beta 1 \leq 15$, $0 \leq \beta 2 \leq 15$, $0 \leq \beta 3 \leq 15$, $1 \leq \beta 1+\beta 2+\beta 3 \leq 15$, $60 \leq \gamma \leq 90$, $15 \leq \delta \leq 30$, and $0 \leq \epsilon \leq 10$.

In another aspect of the present invention, an optical recording medium is provided which includes a substrate, a recording layer overlying the substrate, a Ag-based reflection layer located overlying the recording layer and including Ag in an amount not less than 95% by weight, and an overcoat layer located overlying the reflection layer and having a glass transition temperature of from 90° C. to 180° C.

Alternatively, the optical recording medium includes an adhesive layer instead of the overcoat layer, and a second substrate located on the adhesive layer, wherein the adhesive layer has a glass transition temperature of from 90° C. to 180° C. It is preferable that an overcoat layer is formed between the adhesive layer and the reflection layer and the difference in glass transition temperature between the overcoat layer and adhesive layer is not greater than 50° C.

It is preferable that the reflection layer includes Ag and Cu, wherein the content of Cu is from 0.1% by weight to 5% by weight.

The recording layer preferably has a formula $Ag_{\alpha 1}Ge_{\alpha 2}In_{\beta 1}Ga_{\beta 2}Bi_{\beta 3}Sb_\gamma Te_\delta M_\epsilon$, wherein total of $\alpha 1+\alpha 2+\beta 1+\beta 2+\beta 3+\gamma+\delta+\epsilon=100$ atomic percent, and wherein $0 \leq \alpha 1 \leq 10$, $0 \leq \alpha 2 \leq 10$, $0.1 \leq \alpha 1+\alpha 2 \leq 10$, $0 \leq \beta 1 \leq 15$, $0 \leq \beta 2 \leq 15$, $0 \leq \beta 3 \leq 15$, $1 \leq \beta 1+\beta 2+\beta 3 \leq 15$, $60 \leq \gamma \leq 90$, $15 \leq \delta \leq 30$, and $0 \leq \epsilon \leq 10$.

In yet another aspect of the present invention, a method for manufacturing an optical recording medium is provided which includes:

forming at least a first protective layer, a recording layer, and a second protective layer on a substrate in this order to overlay the first protective layer, recording layer, and second protective layer on the substrate; and forming a third protective layer including Si in an amount not less than 35% by sputtering; and forming a reflection layer including Ag in an amount not less than 95% by weight by sputtering, wherein the following relationships are satisfied:

$$0.02 \leq Rm/Rr \leq 0.20, \text{ and } 0.5 \text{ nm/sec} \leq Rm \leq 5.0 \text{ nm/sec},$$

wherein Rm represents the film forming speed of the third protective layer and Rr represents the film forming speed of the reflection layer.

Preferably the following relationship is satisfied:

$$1.5 \times Pm \leq Pr,$$

wherein Pm represents the sputtering power applied for forming the third protective layer, and Pr represents the sputtering power applied for forming the reflection layer.

It is preferable that the sputtering is performed using a mixture of SiC and SiOx as a target when the third protective layer is formed.

Alternatively, the sputtering can be performed by reaction sputtering using SiC as a target and using a mixture gas of Ar and one of $O_2$, CO and $CO_2$.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

The present invention will be explained in detail.

Figure 3:
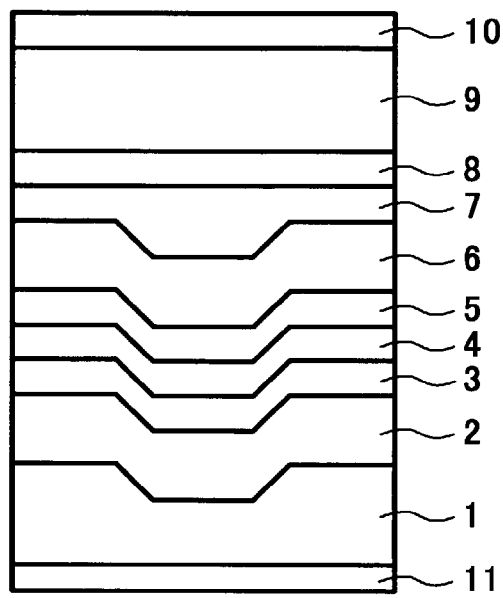
FIG. 3 is a schematic diagram illustrating a sectional view of another DVD-type embodiment of the optical recording medium of the present invention.
Figure 4:
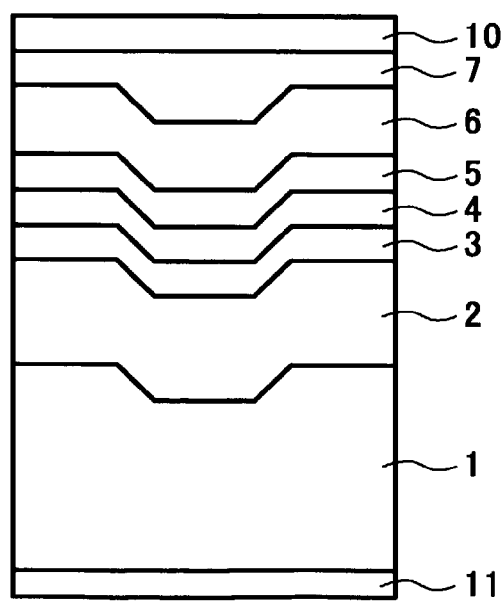
FIG. 4 is a schematic diagram illustrating a sectional view of another CD-type embodiment of the optical recording medium of the present invention.

FIGS. 1 to 4 illustrates the cross-sections of embodiments of the optical recording medium of the present invention. As a typical constitution of the optical recording medium, a first protective layer 2, a recording layer 3, a second protective layer 4, a third protective layer 5, a reflection layer 6 and a resin protective layer (hereinafter referred to as an overcoat layer) 7 are overlaid on a substrate 1. If desired, a print layer 10 may be formed on the surface of the recording medium. In addition, as illustrated in FIGS. 3 and 4, a hard coat layer 11 may be formed on the surface of the substrate 1 to prevent the surface from being scratched, i.e., such that the incident reproduction laser light is not scattered at the surface.

Figure 1:
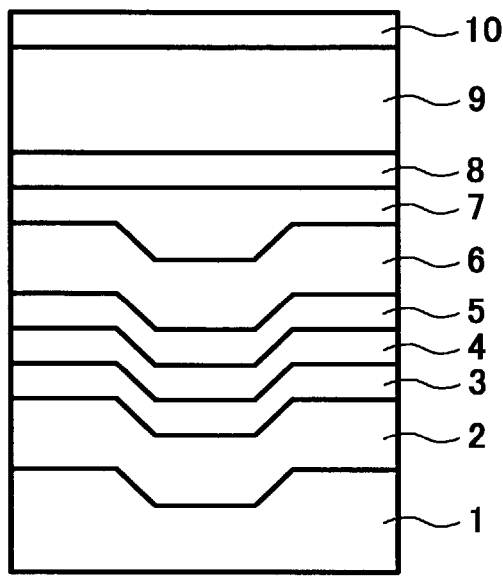
FIG. 1 is a schematic diagram illustrating a sectional view of a DVD-type embodiment of the optical recording medium of the present invention.
Figure 2:
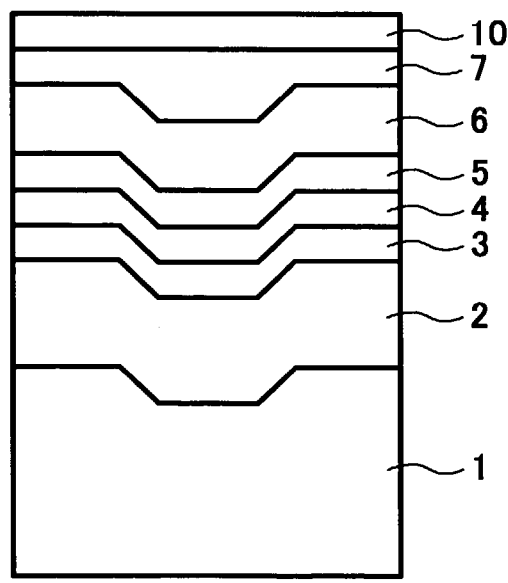
FIG. 2 is a schematic diagram illustrating a sectional view of a CD-type embodiment of the optical recording medium of the present invention.

In addition, when the optical recording medium is used as a DVD-type recording medium, such a recording medium (hereinafter sometimes referred to as a second disc or a second single plate disc) as mentioned above or a transparent substrate can be adhered on the surface thereof with an adhesive layer 8 therebetween. In FIGS. 1 and 3, numeral 9 denotes the second disc or a transparent substrate. When the second disc is adhered to the recording medium without a print layer therebetween, a print layer may be formed on the surface of the second disc 9. Further, it is possible that the overcoat layer 7 also serves as the adhesive layer 8.

Suitable materials for use as the substrate include glass, ceramics and resins. Among these materials, resins are preferably used because of having good moldability and low cost.

Specific examples of the resins include polycarbonate resins, acrylic resins, epoxy resins, polystyrene resins, acrylonitrile-styrene copolymer resins, polyethylene resins, polypropylene resins, silicone resins, fluorine-containing resins, ABS (acrylonitrile-butadiene-styrene) resins, urethane resins, etc. Among these resins, polycarbonate resins, and acrylic resins are preferable because of having good moldability and optical properties, and low cost.

When the optical recording medium of the present invention is used as a DVD-ROM compatible rewritable optical recording medium, the recording medium preferably satisfies the following conditions:

(1) width of grooves formed on the substrate: 0.10 to 0.40 µm (preferably 0.15 to 0.35 µµm);

(2) depth of grooves formed on the substrate: 15 to 45 nm (preferably 20 to 40 nm).

When these conditions are satisfied, reproduction properties can be improved when the recording medium is used for DVD-ROM drives.

In addition, the thickness of the substrate is preferably from 0.55 to 0.65 mm. The total thickness of a laminated disc in which two discs are adhered to each other is preferably 1.1 to 1.3 mm.

When the optical recording medium of the present invention is used as a CD-RW medium, the recording medium preferably satisfies the following conditions:

(1) width of grooves formed on the substrate: 0.25 to 0.65 µm (preferably 0.30 to 0.60 µm)

(2) depth of grooves formed on the substrate: 20 to 50 nm (preferably 25 to 45 nm).

Suitable materials for use in the first and second protective layers include materials including ZnS and $SiO_2$ such as $ZnS.SiO_2$ (85/15 by mole), $ZnS.SiO_2$ (80/20 by mole), and $ZnS.SiO_2$ (75/25 by mole). In addition, other materials such as oxides, e.g., SiO, $SiO_2$, ZnO, $SnO_2$, $Al_2O_3$, $TiO_2$, $In_2O_3$, MgO and $ZrO_2$; nitrides, e.g., $Si_3N_4$, AlN, TiN, BN and ZrN; sulfides, e.g., ZnS and $TaS_4$; carbides, e.g., SiC, TaC, $B_4C$, WC, TiC and ZrC; diamond like carbon, and mixtures thereof can also be used.

In particular, since the protective layers (i.e., the first and second protective layers 2 and 4 in FIGS. 1 and 2) adjacent to the phase change recording layer tend to be heat-damaged due to large heat expansion and temperature change, a material $ZnS.SiO_2$ (80/20 by mole) is preferably used therefor because of having well-balanced optical properties, heat expansion coefficient and elastic modulus.

The thickness of the first protective layer 2 largely influences on the reflectance, modulation and recording sensitivity of the recording medium, and is preferably from 60 to 120 nm to impart good signal properties to the recording medium.

The thickness of the second protective layer 4 is from 5 to 45 nm and preferably from 7 to 40 nm. When the second protective layer is too thin, the second protective layer does not function as a heat resistant protective layer, and recording sensitivity deteriorates. In contrast, when the second protective layer is too thick, the peeling problem in that the second protective layer is peeled from the adjacent layers tends to occur, and the repeat-recording properties of the recording medium deteriorate.

Suitable phase change materials for use in the recording layer include $Sb_xTe_{100-x}$ (x is from 40 to 80 atomic %), which can induce a crystal-amorphous phase change and can achieve semi-stable state in both phases. By using such phase change materials, the resultant recording medium has good recording (i.e., amorphism) sensitivity (i.e., high recording speed), good erasing (i.e., crystallization) sensitivity (i.e., high erasing speed) and good erasure ratio.

In addition, the phase change recording layer is needed not only perform recording and erasing, but also record signals having good reproduction stability and long life (i.e., good reliability) even when high density recording is performed in a high linear speed range.

In attempting to satisfy such requirements, recording layers including a SbTe-type material, such as GeSbTe, AgInSbTe and GeInSbTe, as a main component, are commercialized now.

In order to perform recording at a high speed not lower than 10 m/sec, materials having a formula, $(Ag$ and/or $Ge)_\alpha(In$ and/or $Ga$ and/or $Bi)_\beta Sb_\gamma Te_\delta M_\epsilon$, wherein total of $\alpha+\beta+\gamma+\delta+\epsilon=100$ atomic %, and wherein $0.1 \leq \alpha \leq 10$, $1 \leq \beta \leq 15$, $60 \leq \gamma \leq 90$, $15 \leq \delta \leq 30$, and $0 \leq \epsilon \leq 10$, can be preferably used.

When a recording medium having a formula in this formula range, the recording medium can perform recording at a high speed not lower than 10 m/sec. In addition, the recording medium can perform CAV recording in which the angular speed is constant and the recording speed at the outermost portion of the recording medium is 2.4 times faster than that at the innermost portion thereof.

Suitable elements for use as the element M in the above-described formula include metals having a smaller heat conductivity than that of Sb. Specific examples thereof include lanthanum series metals such as Sc, Y, La, Ce, Pr, Nd, Sm, Eu, Gd, Tb, Dy and Ho; Ti, Zr and Mn.

The addition quantity of the element M is preferably not greater than 10 atomic %. When the addition quantity is too large, the recording and erasing properties deteriorate, and therefore the overwriting properties deteriorate.

Materials having a cubic lattice type crystal structure which is an isotropic crystal structure and preferably a NaCl type crystal structure after initialization (i.e., in an unrecorded state) are preferably used as the phase change recording material. This is because the amorphous state of the materials is also highly isotropic, and therefore the phase change can be stably performed, i.e., recording and erasing can be uniformly performed at a high speed.

The thickness of the phase change recording layer is from 10 to 50 nm and preferably from 12 to 30 nm. In view of the initial properties such as jitter, overwriting properties and mass production efficiency, the thickness is more preferably from 13 to 25 nm. When the recording layer is too thin, the light absorbing ability of the recording layer deteriorates and therefore the recording layer cannot carry out the function thereof. In contrast, when the recording layer is too thick, uniform phase change cannot be made particularly at a high speed.

The phase change recording layer can be formed by a method such as vacuum deposition methods, sputtering methods, plasma CVD methods, light CVD methods, ion plating methods and electron beam deposition methods. Among these methods, sputtering methods are preferably used because of having good productivity and film formability.

Figure 5:
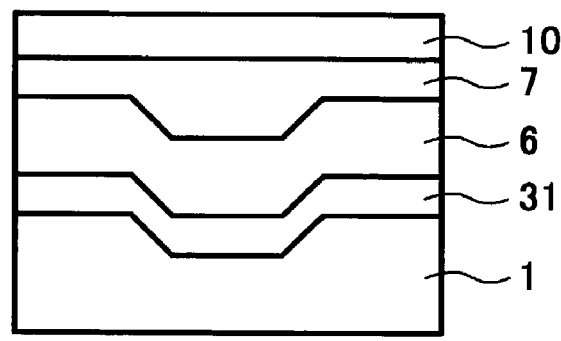
FIG. 5 is a schematic diagram illustrating a sectional view of yet another embodiment of the optical recording medium of the present invention.
Figure 6:
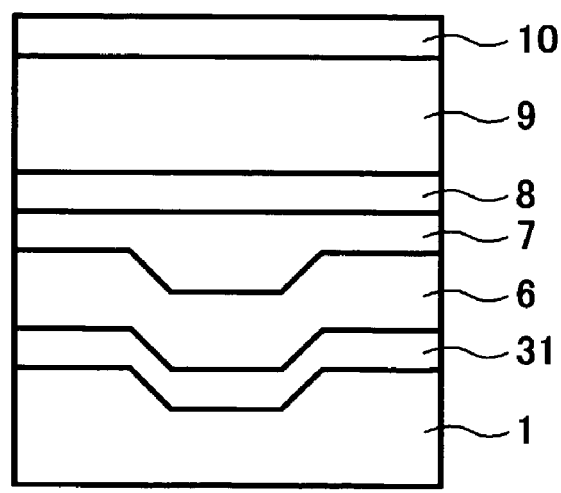
FIG. 6 is a schematic diagram illustrating a sectional view of a further embodiment of the optical recording medium of the present invention.

In the present invention, a dye layer can also be used as the recording layer. In this case, the recording medium may has a structure as illustrated in FIGS. 5 and 6. In FIGS. 5 and 6, numeral 31 denotes a dye recording layer. Numerals 1, 6, 7, 8, 9 and 10 denote a substrate, a Ag-based reflection layer, an overcoat layer, an adhesive layer, a second substrate (or a second disc) and a print layer. Specific examples of the dyes include cyanine dyes, pyrylium dyes, thiopyrylium dyes, azulenium dyes, squarilium dyes, metal complex dyes including Ni or Cr, naphthoquinone dyes, anthraquinone dyes, indophenol dyes, indoaniline dyes, triphenylmethane dyes, triarylmethane dyes, aminium dyes, diimmonium dyes, nitroso compounds, azo dyes, and phthalocyanine dyes. These compounds can be used alone or in combination. In addition, a binder resin and/or a photo-stabilizer can be included in the dye-type light absorbing layer.

The thickness of the dye-type light absorbing layer is preferably from 10 nm to 500 nm, and more preferably from 50 to 300 nm. When the dye-type light absorbing layer is too thin, the amplitude of recorded signals and the recording sensitivity deteriorate. To the contrary, the dye-type light absorbing layer is too thick, the reflectance of the light absorbing layer deteriorates. Therefore the thickness of the light absorbing layer is determined while taking these points into consideration.

The dye-type light absorbing layer is typically prepared by coating an organic solvent solution of a light absorbing dye on a substrate using a spin coating method. In this case, the revolution of the rotated substrate is preferably controlled such that the resultant dye-type light absorbing layer has a desired thickness.

Further, magneto-optical recording materials such as FeTbCo can also be used for the light absorbing layer (i.e., the recording layer).

These recording layers are preferably used alone, however, multi-layered recording layers can be used. In this case, it is possible to insert a dielectric layer between the multi-layered recording layers. In addition, a combination of a phase-change light absorbing layer with a dye-type light absorbing layer; and a combination of a phase-change light absorbing layer with a magneto-optical recording layer, can also be used. By using such combination recording layers, it becomes possible to record and reproduce information in the optical recording medium using a recording apparatus which uses different light for recording and reproducing.

The present inventor have investigated to solve the problems of the Ag-based reflection layer. As a result thereof, it is found that in order to maintain the advantages of Ag, i.e., high reflectance and high heat conductivity, the silver used therein preferably has a purity not less than 95% by weight. However, when silver having a purity not less than 95% by weight is used in a reflection layer, the resultant recording medium has poor reliability particularly under high temperature and high humidity conditions and the reflection layer tends to be peeled from the adjacent layers or corroded.

The present inventors have investigated why the peeling and corrosion problems occur. As a result thereof, it is found that sulfur-containing materials and chlorine-containing materials included in the resin protective layer and/or adhesive layer are contacted with silver in the reflection layer in the presence of water ($H_2O$), and thereby the silver is corroded. It is also found that corrosion is caused such that the sulfur source materials and chlorine source materials reaching the surface of the silver (i.e., the reflection layer) invade into the reflection layer with water serving as a vehicle through the silver grain boundaries.

In order to avoid the corrosion problem, at least one element which has good compatibility with silver and which is selected from the group consisting of Al, Bi, Ca, Cu, Cd, Fe, Mn, Mg, Ni, Pd, Ob, Sb, Zn and Nd is added to the reflection layer. In particular, Cu and Nd are preferably added thereto. By adding these elements, oxidation of silver can be prevented and in addition generation of voids caused by aggregation of silver grains can also be prevented.

Recently, there is a strong demand for reliability of the optical recording media particularly under high temperature conditions. For example, when an optical recording medium is used for car navigation systems, there is a demand for good reliability at about 70° C. By using such a silver alloy as mentioned above, the reliability of the silver reflection layer can be improved, but the reliability thereof at an environmental temperature not less than 70° C. is not satisfactory. It is known that when the environmental temperature is 70° C., the real temperature of the surface of the optical disc located in car navigation systems is from about 85 to about 90° C. Namely, the optical recording medium is needed to have good reliability at a temperature of from 80 to 90° C.

Further, such silver alloys as mentioned above have a relatively high cost. Therefore, a need exists for an excellent measure against the problems.

As mentioned above, peeling and corrosion of the Ag-based reflection layer is greatly influenced by water. Therefore, it is considered that the reliability of the Ag-based reflection layer is deteriorated by an electrochemical action. Namely, it is considered that the Ag-based reflection layer is deteriorated by electric deviation, polarization and ionization of Ag atoms.

Based on such knowledge, the present inventors discover that the below-mentioned three factors are important to improve the reliability of the Ag-based reflection layer:

(1) to prevent silver from contacting with water;
(2) to form the Ag-based reflection layer on a layer which hardly causes polarization and ionization; and
(3) to improve the adhesion of the Ag-based reflection layer to an under layer contacting the reflection layer using a physical method instead of a chemical bonding method.

The present inventors have investigated the following measures:

(a) to form an overcoat layer and/or an adhesive layer which can prevent invasion of moisture into the Ag-based reflection layer; and
(b) to form a third protective layer (i.e., a layer modifying the surface of the reflection layer), which is suitable for the Ag-based reflection layer.

At first, the item (a) will be explained in detail.

The present inventors have investigated the reason for the corrosion and peeling problems of the Ag-based reflection layer. As a result thereof, it is found that the problems depend on the glass transition temperature of the overcoat layer and/or adhesive layer covering the Ag-based reflection layer. Namely, it is found that the properties such as water permeability and linear expansion coefficient of the layers dramatically increase when the layers are heated to a temperature not lower than the glass transition temperature of the layers. Therefore moisture can easily reach the surface of the Ag-based reflection layer, resulting in occurrence of the corrosion and peeling problems, and thereby the recording medium is deteriorated.

Therefore, in order to impart reliability at 90° C. to a recording medium (or in order to prevent occurrence of the problems even after the recording medium is subjected to a typical reliability test at 80° C. and 85% RH), it is preferable that the overcoat layer and/or adhesive layer have a glass transition temperature not lower than 90° C. It is more preferable that the layers have a glass transition temperature not lower than 100° C. at which the permeation speed of water is maximized.

Figure 7:
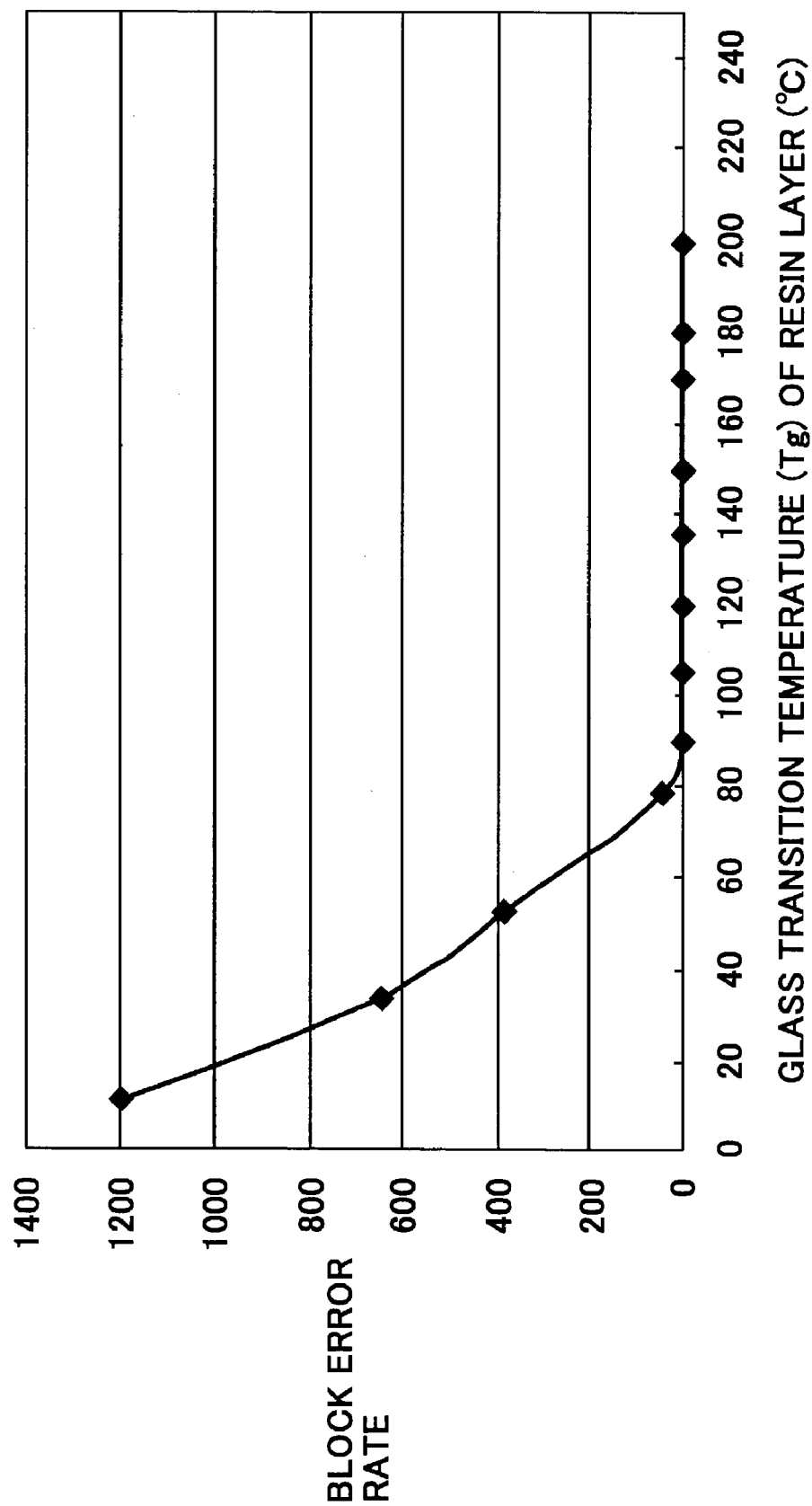
FIG. 7 is a graph illustrating the relationship between the glass transition temperature of a resin layer formed on an Ag-based reflection layer and the block error rate of the resultant optical recording medium after a high temperature preservation test.

FIG. 7 illustrates the relationship between the glass transition temperature of a resin layer located on the Ag-based reflection layer and the block error rate of the resultant recording medium after a 1000-hour preservation test at 90° C. and 80% RH. As can be understood from FIG. 7, when the glass transition temperature is lower than 90° C., the block error rate suddenly increases.

However, the glass transition temperature of the overcoat layer and/or adhesive layer is too high, another problem in that the recording medium has low flexural strength and thereby the recording medium is easily broken when dropped on a floor or taken out of a plastic case tends to occur. Therefore, in order to prevent such a problem, the glass transition temperature of the overcoat layer and/or adhesive layer is not higher than 180° C. and preferably not higher than 165° C.

In addition, when the resin protective layer and the adhesive layer are overlaid on the reflection layer while contacting with each other and the glass transition temperatures of the layers are largely different from the other, the heat expansion rate of the layers becomes largely different from the other. As a result thereof, the resultant recording medium deforms, bends and/or tilts, and thereby recording and/or reproduction errors are often made particularly at a high speed not lower than 10 m/sec, and particularly not lower than 15 m/sec. Therefore, in order to stably perform recording and reproduction at a high speed not lower than 10 m/sec, the difference in glass transition temperature between the overcoat layer and the adhesive layer is preferably not greater than 50° C., and more preferably not greater than 30° C.

When guide grooves formed on the substrate are wobbling, this phenomenon remarkably occurs. In particular, as the frequency of the wobbling grooves becomes high, it becomes impossible to perform high speed recording and reproducing. When the cycle of the wobbling grooves is not greater than 10 µm, the difference in glass transition temperature between the overcoat layer and the adhesive layer is preferably not greater than 30° C.

Specifically, it is preferable that the overcoat layer and the adhesive layer are made of the same material.

The glass transition temperature of a resin is defined as a temperature at which the properties such as volume weight ratio, specific heat, refractive index, dielectric constant, diffusion constant and elastic modulus suddenly change. The glass transition temperature of resins depends on intermolecular force of the monomers used for forming the resins, which force changes depending on the chemical structure, and size of the substituents of the monomers. In particular, the glass transition temperature of a resin can be controlled by controlling the source materials thereof such as monomers and oligomers, the mixing ratio of the source materials, and density of polymerization active sites. The glass transition temperature can be defined as a temperature at which the tan δ curve, which can be obtained using a viscoelasticity measuring instrument, has an inflection point.

The thickness of the Ag-based reflection layer is from 50 nm to 200 nm, and preferably from 70 nm to 160 nm. It is possible to form a multi-layered Ag-based reflection layer. When a multi-layered reflection layer is used, the thickness of each layer is not less than 10 nm and the total thickness thereof is preferably from 50 to 160 nm. When a reflection layer is used as a semi-transparent reflection layer which is typically used for a recording medium having a multi-layered recording layer, the thickness of the reflection layer is preferably from 10 nm to 50 nm.

The reflective layer can be formed by a method such as vacuum deposition methods, sputtering methods, plasma CVD methods, light CVD methods, ion plating methods and electron beam deposition methods. Among these methods, sputtering methods are preferably used.

On the reflection layer, an overcoat layer is formed. As the overcoat layer, an ultraviolet crosslinking resin layer which is formed by a spin coating method is preferably used. The thickness of the overcoat layer is from 3 µm to 15 µm. When the overcoat layer is too thin, a problem in that when a print layer is formed thereon, reproduction errors increase tends to occur. In contrast, when the overcoat layer is too thick, the internal stress increases, resulting in deterioration of the recording medium.

It is preferable that the surface of the recording medium has a hardness harder than the grade H represented by the pencil hardness. In addition, it is preferable to add an electroconductive material in the recording medium to impart an antistatic property to the recording medium, i.e., to prevent adhesion of dust to the recording medium.

The print layer is formed to impart abrasion resistance to the recording medium, to print a label printing such as brand name, and/or to form a receiving layer on which an ink image is formed by an inkjet printing method. The print layer is typically formed by screen-printing an ultraviolet crosslinking resin.

The thickness of the print layer is from 3 μm to 50 μm. When the print layer is too thin, the resultant print layer becomes uneven. In contrast, when the print layer is too thick, the internal stress increases, resulting in deterioration of the mechanical properties of the recording material.

The adhesive layer is typically formed using a material such as ultraviolet crosslinking resins, hot-melt adhesives, and silicone resin adhesives. The adhesive layer is formed, for example, by coating such a material as mentioned above on the overcoat layer or print layer, using a coating method such as spin coating methods, roll coating methods and screen coating methods. Then the thus coated adhesive layer is subjected to an ultraviolet irradiation treatment, a heating treatment or a pressing treatment, and a second disc (i.e., a second single plate disc) or a transparent substrate is adhered on the adhesive layer.

When the second disc or transparent substrate is adhered, an adhesive may be or may not be formed on the surface of the second disc or transparent substrate to be adhered. In addition, the adhesive layer may be replaced with an adhesive sheet.

The thickness of the adhesive layer is not particularly limited, but the thickness is from 5 to 100 μm, and preferably from 7 to 80 μm in view of coating properties and crosslinking properties of the material used, and mechanical properties of the resultant recording medium.

The adhesive-applied area of a surface of the second transparent substrate (or the second single plate disc) on which an adhesive is applied is not particularly limited. However, when the recording medium is applied to a DVD and/or CD compatible optical recording medium, the distance between the inside end of the portion and the center of the recording media is preferably from 15 mm to 40 mm, and more preferably from 15 mm to 30 mm so that the high speed recording can be performed on the recording medium.

Then the item (b) (to form a third protective layer (i.e., a layer modifying the surface of the reflection layer), which is suitable for the Ag-based reflection layer) will be explained.

Conventionally, a Ag-based reflection layer is formed on ZnS.SiO$_2$ layer. However, elements Zn and S are included in the ZnS.SiO$_2$ layer, and therefore the surface of the layer is electrochemically active. In addition, in SiO$_2$, the element Si is positively polarized, and the element O is negatively polarized when microscopically analyzed. Therefore the layer has good wettability to water and tends to contain water therein. Accordingly it is not preferable to form a Ag-based reflection layer thereon.

The present inventors have an idea such that the surface of the second protective layer (i.e., a ZnS.SiO$_2$ layer) should be modified, i.e., the third protective layer (i.e., a surface modifying layer) is formed on the second protective layer.

The requirements for the third protective layer are as follows:
(1) to include a nonmetal which does not electrochemically affects silver;
(2) to include an element having a smaller electronegativity than that of silver;
(3) to include a material having a relatively small bond energy to easily modify physically the surface of the third protective layer; and
(4) to include an amorphous material such that moisture and impurities do not migrate into the grain boundaries of the Ag-based reflection layer.

As a result of the present inventors' investigation, it is found that an element Si fulfills the above-mentioned requirements. Silicon has the following properties:
(1) Silicon is a nonmetal (semi-metal) and has an electronegativity of 1.8 which is less than that (1.9) of silver; and
(2) the bond energy of the Si—Si bonding is 76 kcal/mole, which is smaller than those (104, 192 and 144 kcal/mole, respectively) of the Si—C, Si—O and C—C bonding.

The present inventors prepared various optical recording media which have a constitution as illustrated in FIG. 1 and can be used as a DVD+RW and which have different third protective layers including Si.

The recording media were prepared by forming a first protective layer made of ZnS.SiO$_2$ (80/20 by mole) and having a thickness of 80 nm, a recording layer made of Ga$_3$Ge$_3$Mn$_3$Sb$_{71}$Te$_{20}$ and having a thickness of 15 nm and a second protective layer made of ZnS.SiO$_2$ (80/20 by mole) and having a thickness of 15 nm, and a third protective layer made of each of the materials listed in Tables 1-1 and 1-2 and having a thickness of 5 nm, and a reflection layer including Ag in an amount of 99.99% by weight and having a thickness of 140 nm, on a polycarbonate substrate having a thickness of 0.6 mm, using a sputtering method. Then a resin protective layer having a glass transition temperature of 130° C. was formed thereon and a cover substrate was adhered to the resin protective layer with an adhesive having a glass transition temperature of 135° C.

The recording media were subjected to a heat cycle test 6 times in which a cycle of preservation at 25° C. and 95% RH for 12 hours, followed by preservation at 40° C. and 95% RH for 12 hours was repeated while the recording media were heated and cooled at a heating or cooling speed of 10° C./hour when the temperature was changed.

TABLE 1-1

| Number of Experiment | Material of third protective layer | Atomic percent of element (electronegativity) | | | |
|---|---|---|---|---|---|
| | | C (2.5) | O (3.5) | N (3) | Si (1.8) |
| 1 | SiO$_2$ | — | 66.7 | — | 33.3 |
| 2 | Si$_{60}$O$_{40}$ | — | 40 | — | 60 |
| 3 | Si$_{70}$O$_{30}$ | — | 30 | — | 70 |
| 4 | Si | — | — | — | 100 |
| 5 | Si$_{70}$C$_{30}$ | 30 | — | — | 70 |
| 6 | Si$_{50}$C$_{50}$ | 50 | — | — | 50 |
| 7 | Si$_{25}$C$_{75}$ | 75 | — | — | 25 |
| 8 | Si$_{15}$C$_{85}$ | 85 | — | — | 15 |
| 9 | Si$_{55}$C$_{35}$O$_{10}$ | 35 | 10 | — | 55 |
| 10 | Si$_{45}$C$_{45}$O$_{10}$ | 45 | 10 | — | 45 |
| 11 | Si$_{40}$C$_{50}$O$_{10}$ | 50 | 10 | — | 40 |
| 12 | Si$_{38}$N$_{62}$ | — | — | 62 | 38 |
| 13 | Si$_3$N$_4$ | — | — | 57.1 | 42.9 |
| 14 | Si$_{55}$N$_{45}$ | — | — | 45 | 55 |
| 15 | Ti | — | — | — | — |

TABLE 1-1-continued

| Number of Experiment | Material of third protective layer | Atomic percent of element (electronegativity) | | | |
|---|---|---|---|---|---|
| | | C (2.5) | O (3.5) | N (3) | Si (1.8) |
| 16 | TiO$_2$ | — | — | — | — |
| 17 | Mo | — | — | — | — |
| 18 | Ta | — | — | — | — |

TABLE 1-2

| | 1$^{st}$ bonding | | 2$^{nd}$ bonding | | 3$^{rd}$ bonding | | | | |
|---|---|---|---|---|---|---|---|---|---|
| | bond | Energy (kcal/mol) | Bond | Energy (kcal/mol) | Bond | Energy (kcal/mol) | Structure (C/A)* | EN** | FR$^{3*}$ |
| 1 | Si—O | 192 | — | — | — | — | A | 2.93 | 7.7 × 10$^{-5}$ |
| 2 | Si—O | 192 | Si—Si | 76 | — | — | A | 2.48 | 6.3 × 10$^{-6}$ |
| 3 | Si—O | 192 | Si—Si | 76 | — | — | A | 2.31 | 3.9 × 10$^{-6}$ |
| 4 | Si—Si | 76 | — | — | — | — | A | 1.80 | 1.6 × 10$^{-6}$ |
| 5 | Si—Si | 76 | Si—C | 104 | — | — | A | 2.01 | 2.1 × 10$^{-6}$ |
| 6 | Si—C | 104 | — | — | — | — | A | 2.15 | 2.0 × 10$^{-6}$ |
| 7 | C—C | 144 | Si—C | 104 | — | — | A | 2.33 | 1.8 × 10$^{-5}$ |
| 8 | C—C | 144 | — | — | — | — | A | 2.40 | 5.2 × 10$^{-4}$ |
| 9 | Si—C | 104 | Si—O | 192 | Si—Si | 76 | A | 2.22 | 1.9 × 10$^{-6}$ |
| 10 | Si—C | 104 | C—C | 144 | Si—O | 192 | A | 2.29 | 2.3 × 10$^{-6}$ |
| 11 | C—C | 144 | Si—C | 104 | Si—O | 192 | A | 2.32 | 2.0 × 10$^{-6}$ |
| 12 | Si—N | 105 | — | — | — | — | A | 2.54 | 1.0 × 10$^{-5}$ |
| 13 | Si—N | 105 | — | — | — | — | A | 2.49 | 8.4 × 10$^{-6}$ |
| 14 | Si—N | 105 | Si—Si | 76 | — | — | A | 2.34 | 5.9 × 10$^{-6}$ |
| 15 | — | — | — | — | — | — | C | 1.50 | 2.3 × 10$^{-5}$ |
| 16 | — | — | — | — | — | — | A | 2.83 | 8.5 × 10$^{-5}$ |
| 17 | — | — | — | — | — | — | C | 1.80 | 3.3 × 10$^{-5}$ |
| 18 | — | — | — | — | — | — | C | 1.50 | 1.2 × 10$^{-5}$ |

*C: crystal state A: amorphous state
**EN: electronegativity
$^{3*}$FR: Failure rate after the heat cycle test In Tables 1-1 and 1-2, all the bondings of the material are listed in order of the number thereof. It is determined by observing the hollow pattern of electron diffraction thereof whether the material is in a crystal state or an amorphous state.

The failure rate is determined as follows. Laser beam irradiates the guide groove in a recording medium in an unrecorded state. The failure rate is defined as follows:

Failure rate=(Ld)/(Lt)

wherein Ld represents the length of a portion of the guide groove whose reflectance is out of the predetermined value, and Lt represents the length of the guide groove which is scanned with the laser light.

Figure 8:
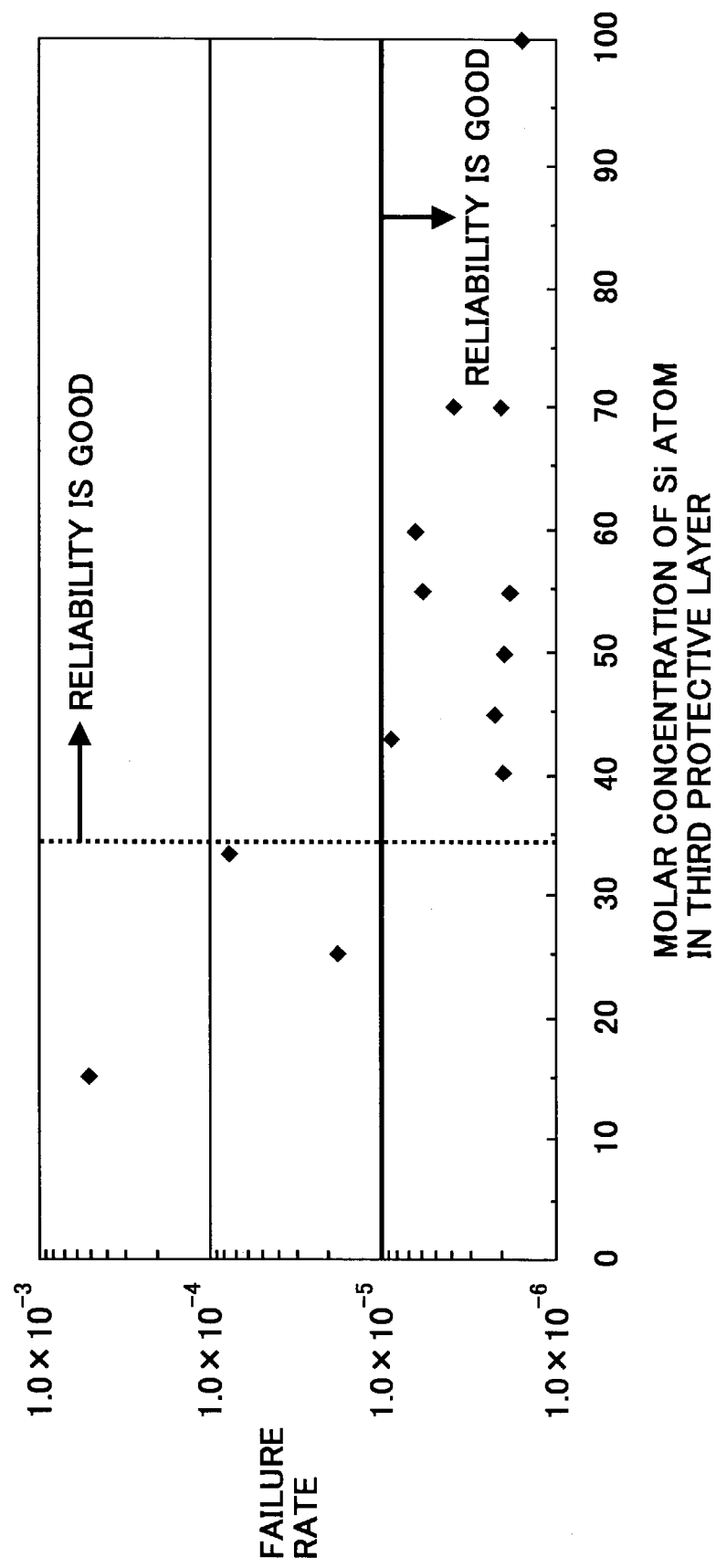
FIG. 8 is a graph illustrating the relationship between the silicon content in a third protective layer and the heat-cycle reliability of the resultant DVD-RW type optical recording medium of the present invention.
Figure 9:
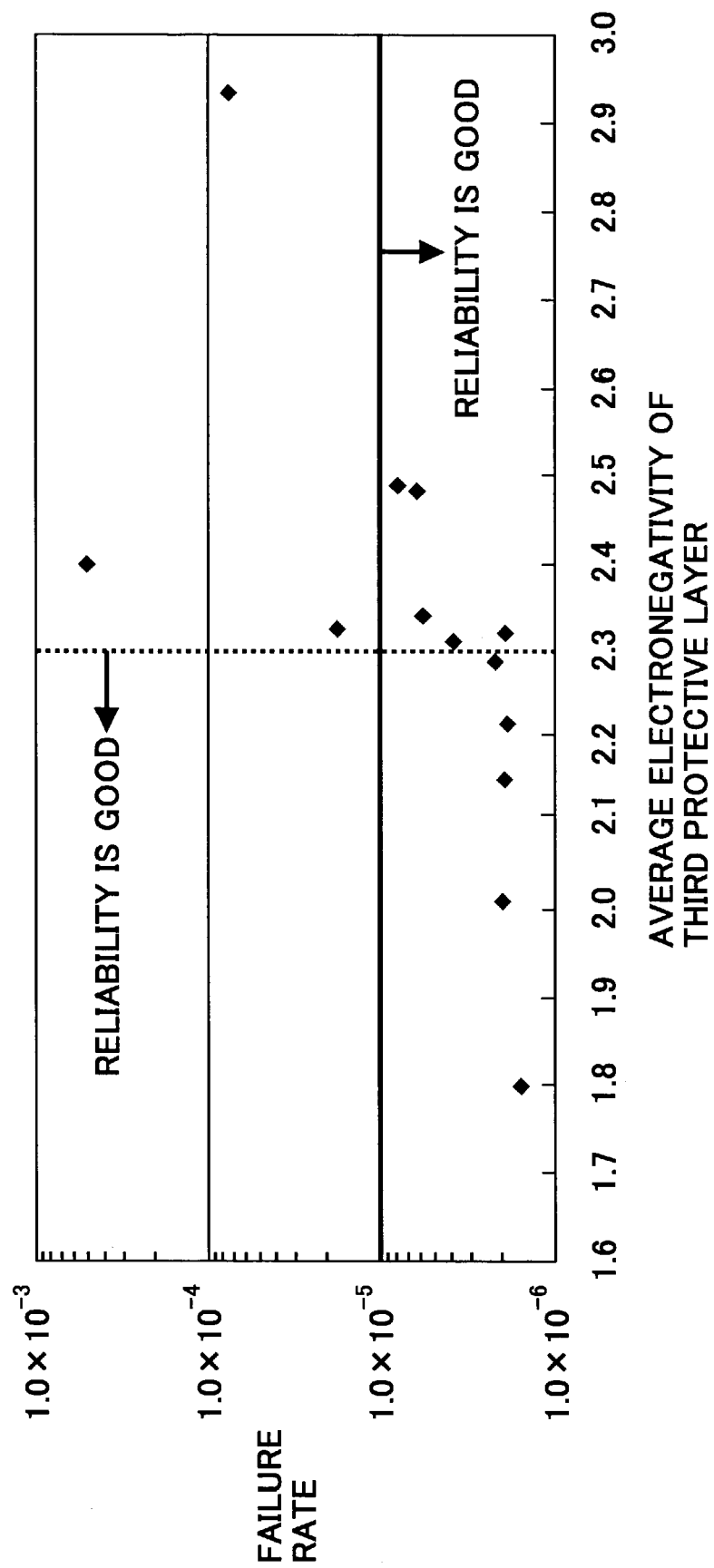
FIG. 9 is a graph illustrating the relationship between the average electronegativity of a third protective layer and the heat-cycle reliability of the resultant DVD-RW type optical recording medium of the present invention.

FIG. 8 is a graph illustrating the relationship between the Si content in the third protective layer and the failure rate of the resultant DVD+RW medium. FIG. 9 is a graph illustrating the electronegativity of the third protective layer and the failure rate of the resultant DVD+RW medium.

As can be understood from FIGS. 8 and 9, in order to impart good reliability (i.e., a failure rate not greater than $1.0 \times 10^{-5}$) to the resultant recording medium, the Si molar concentration in the third protective layer is preferably not less than 35%, and the average electronegativity of the third protective layer is preferably not greater than 2.3.

The average electronegativity is calculated by averaging the electronegativity of the constituent elements of the third protective layer while weighing the content of the constituent elements. Namely, the average electronegativity En(ave) is determined by the following formula:

$$En(ave)=\Sigma[mi \cdot Eni]$$

wherein mi represents the atomic percent of each of the constituent elements, and Eni represents the electronegativity of the constituent element.

The lower limit of the average electronegativity cannot be determined from the viewpoint of at what average electronegativity the effect of the present invention cannot be produced. However, the value (i.e., about 1.50) of the electronegativity of a metal (Ti or Ta) alone in Experiments 15 and 18 in Table 1-2 is considered to be the lower limit. The polarization state of silver in the reflection layer and the third protective layer can be represented by the average electronegativity. When the polarization is large, moisture (H$_2$O) invades into the interface between the reflection layer and the third protective layer, resulting in occurrence of peeling of the reflection layer from the third protective layer.

As mentioned above, it is preferable that the third protective layer includes Si. In order to impart good reliability to the Ag-based reflection layer, it is preferable that the third protective layer includes Si in an amount not less than 35 atomic %. The greater the Si concentration in the third protective layer, the better reliability the reflection layer has. However, it is important to match the third protective layer to the second protective layer in view of heat expansion coefficient, elastic modulus, and chemical reactivity. Therefore it is preferable to add an element such as C, O and N to the third protective layer depending on the materials included in the second protective layer.

Although the third protective layer is thinner than the other layers, the influence of the third protective layer on the properties of the recording medium cannot be neglected. Although Si is good in view of reliability, Si has a weak light absorbing ability. Therefore, when the third protective layer is too thick, high reflectance cannot be imparted to the resultant recording medium.

When the second protective layer is made of ZnS.SiO$_2$, the third protective layer is preferably made of Si, SiC, or a material including Si, C and O which is prepared by adding O to SiC. In particular, materials which are mixtures of SiC (main component) and SiOx or mixtures of SiC (main component), C and SiOx are preferable.

SiC has good properties such as high melting point, good thermo-stability, and good denseness (i.e., being nonporous). Therefore, even when the third protective layer is thin, the third protective layer can prevent reaction of sulfur included in the second protective layer with silver included in the reflection layer. However, since SiC has high hardness and poor reactivity with silver, SiC has poor adhesion to the Ag-based reflection layer. In contrast, when a material including Si, C and O is used for the third protective layer, the adhesion dramatically increases and corrosion of the Ag-based reflection layer can be suppressed.

The thickness of the third protective layer is set to a proper value so that the resultant third protective layer does not deteriorate the high reflectance and high heat conductivity of the Ag-based reflection layer. In addition, the thickness is determined such that the resultant third protective layer does not deteriorate the good properties of the second protective layer, such as good heat-deformation preventing property which is needed in recording and erasing, good recording sensitivity control function, and good phase-change control function of controlling the phase-change of the recording layer from an amorphous state to a crystal state which function is needed for initializing a large diameter LD.

As a result of the present inventors' investigation, it is found that when the third protective layer has a thickness of from 2 to 9 nm, the resultant recording medium has good signal properties in recording and erasing, and the Ag-based reflection layer contacting the third protective layer has good reliability.

When the third protective layer has a thickness not less than 2 nm, the layer can be stably manufactured in a continuous manufacturing process while the uniformity of the layer can be secured, and thereby the surface modification function can be well carried out. The thickness of the third protection layer is preferably from 3 to 7 nm. When the thickness falls in this range, the reliability of the Ag-based reflection layer can be dramatically improved without largely changing the basic optical properties and thermal properties of the recording medium.

Specifically, when the recording medium is subjected to 1000-time overwriting in DVD+Rw format at a speed of 14 m/sec, the resultant signals have good jitter property, i.e., not greater than 8%. When the thickness is greater than 9 nm, the layer is such an intermediate layer as disclosed in JP-As. 11-238253 and 2000-331378 rather than a surface modifying layer. Namely, the layer largely influences on the properties of the recording medium, and thereby the design of the recording medium needs to be widely reconsidered to control the optical properties and thermal properties of the recording medium. In addition, internal stress is generated in the third protective layer (i.e., the surface modifying layer) itself, and therefore a problem in that the layer is cracked when subjected to a heat cycle test tends to occur.

As a result of the present inventors' investigation, it is found that good reliability can be imparted to the Ag-based reflection layer while good record/erasure signal properties can be maintained, when the following relationships are satisfied:

$0.1 \leq DM/D2 \leq 0.5$, and $0.01 \leq DM/DR \leq 0.1$, wherein D2 represents the thickness of the second protective layer, DM represents the thickness of the third protective layer, and DR represents the thickness of the reflection layer.

In addition, when the below-mentioned relationships are satisfied, the recorded signals have good jitter property, i.e., not greater than 8%, when the recording medium is subjected to 1000-time overwriting in DVD+Rw format at a speed of 14 m/sec:

$0.15 \leq DM/D2 \leq 0.35$, and $0.03 \leq DM/DR \leq 0.05$.

The third protective layer can be formed by a method such as sputtering methods, plasma CVD methods, plasma treating methods, ion plating methods, and light CVD methods. Among these methods, sputtering methods are preferable. Typical conditions of the sputtering methods are as follows:
(1) pressure: $10^{-2}$ to $10^{-4}$ Pa;
(2) sputtering power: 0.5 to 5.0 kW/200 mm$\phi$; and
(3) film forming speed: 0.5 to 5.0 nm/sec.

At this point, it is preferable that the following relationship is satisfied:

$0.02 \leq Rm/Rr \leq 0.20$, and $0.5$ nm/sec $\leq Rm \leq 5.0$ nm/sec.

In order to prepare a layer constituted of Si, C and O, a sputtering method using a mixture of SiC and SiOx as a target, or a reactive sputtering method using SiC as a target and using a mixture gas of Ar and at least one of O$_2$, CO, CO$_2$, can be preferably used. When a mixture gas of Ar and CO$_2$ is used, the amount of oxygen included in the third protective layer can be controlled by changing the ratio of the Ar flow rate to the CO$_2$ flow rate, as illustrated in Table 2.

It is preferable that when the Ag-based reflection layer is formed, the impingement rate of Ag is from 5 to 50 times greater than the impingement rate of the atoms constituting the third protective layer when the third protective layer is formed. This is because the temperature of the outermost surface of the third protective layer increases and thereby the third protective layer does not have portions having a weak bonding. In addition, when the third protective layer is cooled, the silver atom remains while having a form like a wedge, and thereby the adhesion of the Ag-based reflection layer to the third protective layer can be improved.

The third protective layer is preferably formed at a film forming speed of from 0.5 to 5.0 nm/sec. When the film forming speed is not lower than 0.5 nm/sec, the resultant third protective layer hardly includes gases therein, resulting in formation of a dense film. When the film forming speed is not higher than 5 nm/sec, lot-to-lot variation of the film thickness of the third protective layer can be decreased, i.e., a thin film can be stably manufactured.

It is also preferable that the below-mentioned relationship is satisfied, to improve the adhesion of the Ag-based reflection layer to the third protective layer.

$1.5 \times Pm \leq Pr$, wherein Pm represents the sputtering power when the third protective layer is formed, and Pr represents the sputtering power when the reflection layer is formed.

The reason why the adhesion can be improved is the same as those mentioned above.

In this case, not only the temperature of the surface of the third protective layer is increased, but also the weak-bond portions of the third protective layer can be effectively removed because the sputtering power applied for forming the reflection is not less than 1.5 times greater than that for forming the third protective layer, resulting in increase of impingement rate of ions having large energy.

The upper limit of the sputtering power Pr for forming the reflection layer is the upper limit of the sputtering power of the sputtering instrument used, i.e., the upper limit of the sputtering power at which sputtering can be stably performed by the sputtering instrument used. Specifically, the upper limit is typically about 10 kW.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

A polycarbonate substrate having a thickness of 0.6 nm, on which wobbling grooves having a width of 0.25 μm, a depth of 27 nm and a wobbling period of 4.26 μm are formed was prepared by injection molding. On the substrate, a first protective layer, a recording layer, a second protective layer, a third protective layer, and a reflection layer constituted of silver having a purity of 99.99% by weight were overlaid in this order by sputtering.

The first and second protective layers were made of $ZnS.SiO_2$ (80/20 by mole) and the thickness thereof was 80 nm and 14 nm, respectively.

The recording layer was made of $Ga_3Ge_3Mn_4Sb_{70}Te_{20}$ and the thickness thereof was 16 nm.

The third protective layer was a Si layer having a thickness of 4 nm. The electronegativity of Si is 1.8, which is lower than that (1.9) of silver used in the reflection layer.

The thickness of the Ag-based reflection layer was 140 nm.

The sputtering conditions of each layer are shown in the below-mentioned Table 2.

TABLE 2

| Layer | Film forming speed (nm/sec) | Sputtering power (kW) |
|---|---|---|
| 1st protective layer | 9.0 | 4.0 |
| Recording layer | 5.6 | 0.4 |
| 2nd protective layer | 4.5 | 1.5 |
| 3rd protective layer | 1.5 | 1.5 |
| Reflection layer | 32 | 3.5 |

Thus, a multi-layered plate having the following constitution was prepared.

Polycarbonate substrate (0.6 mm)/$ZnS.SiO_2$ (80 nm)/ $Ga_3Ge_3Mn_4Sb_{70}Te_{20}$ (16 nm)/$ZnS.SiO_2$ (14 nm)/Si (4 nm)/99.99% by weight Ag (140 nm)

Then an ultraviolet crosslinking resin having a viscosity of 120 cps at room temperature was coated on the Ag-based reflection layer by spin coating and crosslinked. The glass transition temperature of the crosslinked resin was 149° C. Thus, an single-plate type optical recording medium was prepared.

Next, a second polycarbonate substrate was adhered thereon with an adhesive having a viscosity of 580 cps at room temperature to prepare a DVD-type optical recording medium having a structure as shown in FIG. 1. The glass transition temperature of the crosslinked adhesive was 135° C.

The optical recording medium was initialized by an initializing apparatus having a large diameter laser diode (LD) under conditions of 3.5 m/sec in linear speed, and 850 nW in laser diode power, to crystallize the recording layer. The initialization was performed from the inside to the outside of the recording medium at a feeding pitch of 120 μm while the linear speed is kept to be constant.

Then the recording medium was subjected to optical recording in DVD-ROM reproducible format at a linear speed of 16.75 m/sec using an apparatus which emits laser light having a wavelength of 650 nm and which has a numerical aperture (NA) of 0.65 and a recording power of 14.5 mW.

As a result, the recorded signals had good data-to-clock jitter, i.e., 7.5%, even after 1000-time direct overwriting (DOW). In addition, the signals had good reflectance (20%) and modulation (63%). Thus, the good properties of silver, i.e., high reflectance and high heat conductivity, can be fully utilized.

Then the recording medium was subjected to a heat cycle test 6 times in which a cycle of preservation at 25° C. and 95% RH for 12 hours, followed by preservation at 40° C. and 95% RH for 12 hours was repeated while the recording medium was heated and cooled at a heating or cooling speed of 10° C./hour when the temperature was changed. As a result, the reflectance, modulation and tilt at a point 58 mm apart from the center thereof were 20%, 63% and 0.4°, respectively, which hardly changed compared to those at the beginning of the heat cycle test. In addition, the failure rate did not increase.

Examples 2 to 13

A polycarbonate substrate having a thickness of 0.6 mm, on which wobbling grooves having a width of 0.25 μm, a depth of 27 nm and a wobbling period of 4.26 μm are formed was prepared by injection molding. On the substrate, a first protective layer, a recording layer, a second protective layer, a third protective layer, and a reflection layer constituted of silver having a purity of 99.99% by weight were overlaid in this order by sputtering.

The first and second protective layers were made of $ZnS.SiO_2$ (80/20 by mole).

The recording layer was made of $Ga_3Ge_3Mn_4Sb_{70}Te_{20}$.

The materials listed in Table 3-1 were used for the third protective layer. The thickness of each layer and manufacturing conditions are shown in Table 3-1.

Then an ultraviolet crosslinking resin having a viscosity of 120 cps at room temperature was coated on the Ag-based reflection layer by spin coating and crosslinked. The glass transition temperature of the crosslinked resin was 149° C. Thus, an single-plate type optical recording medium was prepared.

Next, a second polycarbonate substrate was adhered thereon with an adhesive having a viscosity of 580 cps at room temperature to prepare a DVD-type optical recording medium having a structure as shown in FIG. 1. The glass transition temperature of the crosslinked adhesive was 135° C.

The optical recording medium was initialized by an initializing apparatus having a large diameter laser diode (LD) having a beam diameter of 200×1 μm under conditions of 3.5 m/sec in linear speed, and 850 mW in laser diode power, to crystallize the recording layer. The initialization was performed from the inside to the outside of the recording medium at a feeding pitch of 120 μm while the linear speed is kept to be constant.

Then the recording medium was subjected to optical recording in DVD-ROM reproducible format at a linear speed of 16.75 m/sec using an apparatus which emits laser light having a wavelength of 650 nm and which has a numerical aperture (NA) of 0.65 and a recording power of 14.5 mW.

As a result, the recorded signals had good data-to-clock jitter, i.e., not greater than 8%, even after 1000-time direct overwriting (DOW). In addition, the signals had good reflectance (20%) and modulation (63%). Thus, the good properties of silver, i.e., high reflectance and high heat conductivity, can be fully utilized.

except that the material and the thickness of the third protective layer were changed as shown in Tables 3-1 and 3-2. Thus, optical recording media of Comparative Examples 1 to 7 were prepared and evaluated.

As can be understood from Tables 3-1 and 3-2, in Comparative Example 1 a third protective layer was not formed. In Comparative Examples 2 to 7, the third protective layer satisfies the requirements (to include Si in an amount not less than 35 atomic percent) of the present invention, but does not satisfy the thickness requirement of from 2 to 9 nm because the thickness thereof is 1 nm or 10 nm. Therefore, each optical recording medium caused at least one jitter problem after the 1000-time direct overwriting, the 500-hour preservation test at 80° C. and 85% RH, and/or the heat cycle test. Therefore, judging from the total qualities thereof, all the optical recording media of Comparative Examples 1 to 7 are unacceptable.

TABLE 3-1

|  | D1 (nm) | DRc (nm) | D2 (nm) | M3 | DM (nm) | Rm (nm/s) | DR (nm) | Rr (nm/s) |
| --- | --- | --- | --- | --- | --- | --- | --- | --- |
| Ex. 2 | 80 | 15 | 15 | SiC | 2 | 0.5 | 100 | 30 |
| Ex. 3 | 80 | 15 | 15 | SiC | 4 | 2 | 100 | 30 |
| Ex. 4 | 80 | 15 | 15 | SiC | 6 | 4 | 100 | 30 |
| Ex. 5 | 80 | 15 | 15 | Si | 7 | 5 | 100 | 30 |
| Ex. 6 | 80 | 15 | 20 | Si | 3 | 0.5 | 120 | 30 |
| Ex. 7 | 80 | 15 | 20 | Si | 5 | 2 | 120 | 30 |
| Ex. 8 | 80 | 15 | 20 | SiC | 7 | 4 | 120 | 30 |
| Ex. 9 | 80 | 15 | 20 | SiC | 9 | 5 | 120 | 30 |
| Ex. 10 | 80 | 15 | 25 | SiC | 3 | 0.5 | 140 | 30 |
| Ex. 11 | 80 | 15 | 25 | Si | 5 | 2 | 140 | 30 |
| Ex. 12 | 80 | 15 | 25 | Si | 7 | 4 | 140 | 30 |
| Ex. 13 | 80 | 15 | 25 | Si | 9 | 5 | 140 | 30 |
| Comp. Ex.1 | 80 | 15 | 25 | — | 0 | — | 100 | 30 |
| Comp. Ex. 2 | 80 | 15 | 10 | SiC | 1 | 2 | 100 | 30 |
| Comp. Ex. 3 | 80 | 15 | 20 | SiC | 10 | 5 | 100 | 30 |
| Comp. Ex. 4 | 80 | 15 | 20 | Si | 10 | 5 | 100 | 30 |
| Comp. Ex. 5 | 80 | 15 | 20 | SiO | 10 | 5 | 100 | 30 |
| Comp. Ex. 6 | 80 | 15 | 20 | $Si_3N_4$ | 10 | 5 | 100 | 30 |
| Comp. Ex. 7 | 80 | 15 | 20 | $Si_{45}$—$C_{45}$—$O_{10}$ | 10 | 5 | 100 | 30 |

D1: Thickness of the first protective layer (nm)
DRc: Thickness of the recording layer (nm)
D2: Thickness of the second protective layer (nm)
M3: Material of the third protective layer
DM: Thickness of the third protective layer (nm)
Rm: Film forming speed of the third protective layer (nm/s)
DR: Thickness of the reflection layer (nm)
Rr: Film forming speed of the reflection layer (nm/s)

Then the recording medium was subjected to a preservation test at 80° C. and 85% RH for 500 hours, and a heat cycle test 6 times in which a cycle of preservation at 25° C. and 95% RH for 12 hours, followed by preservation at 40° C. and 95% RH for 12 hours was repeated while the recording medium was heated and cooled at a heating or cooling speed of 10° C./hour when the temperature was changed. As a result, the failure rate did not increase and the resultant recording media hardly committed errors.

Comparative Examples 1 to 7

The procedures for preparation and evaluation of the optical recording media in Examples 2 to 13 were repeated

TABLE 3-2

|  | DM/D2 | DM/DR | Rm/Rr | Jitter1 | Jitter2 | Jitter3 | Total |
| --- | --- | --- | --- | --- | --- | --- | --- |
| Ex. 2 | 0.13 | 0.02 | 0.02 | 8.7% | OK | OK | OK |
| Ex. 3 | 0.27 | 0.04 | 0.07 | 7.4% | OK | OK | OK |
| Ex. 4 | 0.40 | 0.06 | 0.13 | 7.2% | OK | OK | OK |
| Ex. 5 | 0.47 | 0.07 | 0.17 | 7.7% | OK | OK | OK |
| Ex. 6 | 0.15 | 0.03 | 0.02 | 7.6% | OK | OK | OK |
| Ex. 7 | 0.25 | 0.04 | 0.07 | 7.7% | OK | OK | OK |
| Ex. 8 | 0.35 | 0.06 | 0.13 | 7.9% | OK | OK | OK |
| Ex. 9 | 0.45 | 0.08 | 0.17 | 8.9% | OK | OK | OK |
| Ex. 10 | 0.12 | 0.02 | 0.02 | 7.9% | OK | OK | OK |
| Ex. 11 | 0.20 | 0.04 | 0.07 | 7.6% | OK | OK | OK |

TABLE 3-2-continued

|  | DM/D2 | DM/DR | Rm/Rr | Jitter1 | Jitter2 | Jitter3 | Total |
|---|---|---|---|---|---|---|---|
| Ex. 12 | 0.28 | 0.05 | 0.13 | 7.7% | OK | OK | OK |
| Ex. 13 | 0.36 | 0.06 | 0.17 | 8.9% | OK | OK | OK |
| Comp. Ex. 1 | 0.00 | 0.00 | 0.07 | 8.3% | NG | NG | NG |
| Comp. Ex. 2 | 0.10 | 0.01 | 0.07 | 8.3% | OK | NG | NG |
| Comp. Ex. 3 | 0.50 | 0.10 | 0.17 | 12.0% | OK | OK | NG |
| Comp. Ex. 4 | 0.50 | 0.10 | 0.17 | 13.6% | OK | OK | NG |
| Comp. Ex. 5 | 0.50 | 0.10 | 0.17 | 15.4% | OK | OK | NG |
| Comp. Ex. 6 | 0.50 | 0.10 | 0.17 | 15.4% | OK | OK | NG |
| Comp. Ex. 7 | 0.50 | 0.10 | 0.17 | 13.3% | OK | OK | NG |

Jitter1: Jitter after 1000-time overwriting in DVD + RW format at a speed of 14 m/s.
Jitter2: Jitter after the 500-hour preservation test at 80° C. 85% RH.
Jitter3: Jitter after 6-time heat cycle test at 25° C. 95% RH and 40° C. 95% RH.

Examples 14 to 18 and Comparative Examples 8 to 10

A polycarbonate substrate having a thickness of 0.6 mm, on which wobbling grooves having a width of 0.25 μm, a depth of 27 nm and a wobbling period of 4.26 μm are formed was prepared by injection molding. On the substrate, a first protective layer, a recording layer, a second protective layer, a third protective layer, and a reflection layer constituted of silver having a purity of 99.99% by weight were overlaid in this order by sputtering.

The first and second protective layers were made of $ZnS.SiO_2$ (80/20 by mole) and the thickness thereof was 80 nm and 14 nm, respectively.

The recording layer was made of $Ge_{2.0}Ag_{0.5}In_{5.0}Sb_{68.5}Te_{24.0}$ and the thickness thereof was 16 nm.

The third protective layer was formed by a sputtering method using SiC as a target and using a mixture gas as shown in Table 4 under conditions of 0.5 Pa in pressure and 1 kW in sputtering power. The thickness of the third protective layer is 4 nm.

The thickness of the Ag-based reflection layer is 140 nm.

Thus, a multi-layered plate having the following constitution was prepared.

Polycarbonate substrate (0.6 mm)/$ZnS.SiO_2$ (80 nm)/
$Ge_{2.0}Ag_{0.5}In_{5.0}Sb_{68.5}Te_{24.0}$ (16 nm)/$ZnS.SiO_2$
(14 nm)/SiC (4 nm)/Ag (140 nm)

Then an ultraviolet crosslinking resin having a viscosity of 120 cps at room temperature was coated on the Ag-based reflection layer by spin coating and crosslinked. The glass transition temperature of the crosslinked resin was 149° C. Thus, an single-plate type optical recording medium was prepared.

Next, a second polycarbonate substrate was adhered thereon with an adhesive to prepare an optical recording medium having a structure as shown in FIG. 1.

The optical recording medium was initialized by an initializing apparatus having a large diameter laser diode (LD) under conditions of 3.5 m/sec in linear speed, and 850 mW in laser diode power, to crystallize the recording layer. The initialization was performed from the inside to the outside of the recording medium while the linear speed is kept to be constant.

Then the recording medium was subjected to optical recording in DVD-ROM reproducible format at a linear speed of 8.5 m/sec using an apparatus which emits laser light having a wavelength of 650 nm and which has a numerical aperture (NA) of 0.65 and a recording power of 14 mW.

As a result, when the content of oxygen in the third protective layer is not greater than 20 atomic %, the recorded signals had good data-to-clock jitter, i.e., not greater than 9%, even after 1000-time direct overwriting (DOW). When the content of oxygen in the third protective layer is greater than 20 atomic %, the third protective layer was cracked and the reflection layer was peeled from the third protective layer.

When the content of oxygen in the third protective layer is 0, the error increasing rate (i.e., (error after preservation–initial error)/(initial error)) exceeds 10%, and thereby a problem occurred in that a part of the recorded data cannot be read after the 300-hour preservation test at 80° C. 85% RH. In contrast, when the content of oxygen is not less than 1 atomic %, the error increasing rate is not greater than 10%, and the recording medium caused no problem even after the preservation test.

Figure 10:
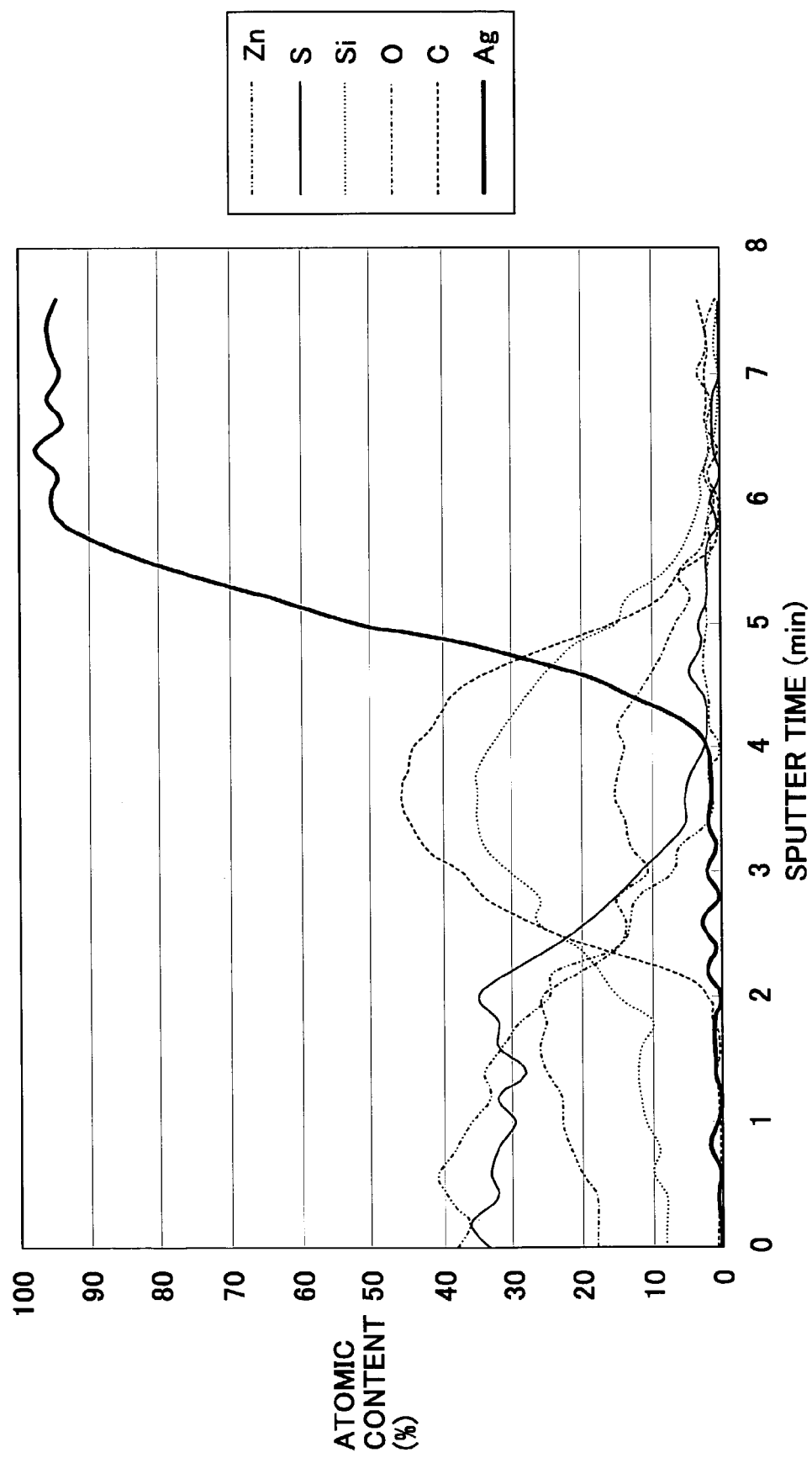
FIG. 10 is a graph illustrating the Auger depth profile of the optical recording medium of Example 17 of the present application.

In addition, the Auger depth profile of the recording medium of Example 17 was measured with an Auger electron spectroscopic depth analyzer. The profile is shown in FIG. 10. As can be understood from FIG. 10, an excessive amount of carbon (C) is included in the layer as the content of Si increases in the layer. The Auger electron is emitted from a surface of a material when high energy electron irradiates the surface of the material, and has energy specific to the material. By spectroscopically analyzing the Auger electron, the ratio of elements constituting the material can be determined.

TABLE 4

|  | Ar flow rate (sccm) | $CO_2$ flow rate (sccm) | Oxygen content in third protective layer (atomic %) | Error increasing rate (%) | The number of over-writing (times) |
|---|---|---|---|---|---|
| Ex. 14 | 10 | 0.3 | 1.1 | 9.5 | 8000 |
| Ex. 15 | 10 | 1 | 3.8 | 7.6 | 6000 |
| Ex. 16 | 10 | 1.5 | 5.6 | 6.0 | 5000 |
| Ex. 17 | 10 | 3 | 10.6 | 4.5 | 3000 |
| Ex. 18 | 10 | 6 | 20 | 3.0 | 1500 |
| Comp. Ex. 8 | 10 | 8 | 24 | 2.0 | 500 |
| Comp. Ex. 9 | 10 | 12 | 32 | 2.5 | 100 |
| Comp. Ex. 10 | 10 | 0 | 0 | 20 | 9000 |

Example 19

A polycarbonate substrate having a thickness of 0.6 mm, on which wobbling grooves having a width of 0.25 μm, a depth of 27 nm and a wobbling period of 4.26 μm are formed was prepared by injection molding. On the substrate, a first protective layer, a recording layer, a second protective layer, a third protective layer, and a reflection layer constituted of silver having a purity of 99.99% by weight were overlaid in this order by sputtering.

The first and second protective layers were made of $ZnS.SiO_2$ (80/20 by mole) and the thickness thereof was 80 nm and 11 nm, respectively.

The recording layer was made of $Ge_2In_7Sb_{70}Te_{20}Mn_1$ and the thickness thereof was 16 nm.

The third protective layer was a SiC layer having a thickness of 4 nm.

The thickness of the Ag-based reflection layer is 140 nm.

Thus, a plate having the following constitution was prepared.

Polycarbonate substrate (0.6 mm)/ZnS.SiO$_2$ (80 nm)/
Ge$_2$In$_7$Sb$_{70}$Te$_{20}$Mn$_1$ (16 nm)/ZnS.SiO$_2$ (11 nm)/
SiC (4 nm)/99.99% by weight Ag (140 nm)

Then an ultraviolet crosslinking resin having a viscosity of 120 cps at room temperature was coated on the Ag-based reflection layer by a spin coating method and crosslinked. The glass transition temperature of the crosslinked resin was 149° C. Thus, an single-plate type optical recording medium was prepared.

Next, a second polycarbonate substrate was adhered thereon with an ultraviolet crosslinking adhesive SD694 having a viscosity of 580 cps (manufactured by Dainippon Ink & Chemicals Inc.) to prepare an optical recording medium having a structure as shown in. FIG. 1. The glass transition temperature of the crosslinked adhesive is 135° C.

The optical recording medium was initialized by an initializing apparatus having a large diameter laser diode (LD) (beam diameter of 200×1 μm) under conditions of 3.0 m/sec in linear speed, and 850 mW in laser diode power, to crystallize the recording layer. The initialization was performed from the inside to the outside of the recording medium at a pitch of 100 μm while the linear speed is kept to be constant.

Then the recording medium was subjected to optical recording in DVD-ROM reproducible format at a linear speed of 16.75 m/sec using an apparatus which emits laser light having a wavelength of 650 nm and which has a numerical aperture (NA) of 0.65 and a recording power of 14.5 mW.

As a result, the recorded signals had good data-to-clock jitter, i.e., 8.5%, even after 1000-time direct overwriting (DOW). In addition, the recorded signals had good properties and the reflectance and modulation thereof were 20% and 63%, respectively. Namely, it can be said that the high reflectance and heat conductivity of silver used in the reflection layer can be fully utilized.

Even after this optical recording medium was subjected to a 500-hour preservation test at 90° C. and 90% RH, the reflectance, modulation and tilt at a point (the outermost point of the disc) 58 mm apart from the center of the disc were 20%, 63% and 0.4°, respectively, which were the same as those at the beginning of the preservation test.

In addition, when overwriting was performed at the outermost point (58 mm apart from the center of the disc) at 70° C. and 90% RH, the recorded signals could be reproduced without causing improper track focusing.

Namely, by forming an overcoat layer having a glass transition temperature of 149° C. and an adhesive layer having a glass transition temperature of 135° C. (i.e., the difference in glass transition temperature between the overcoat layer and adhesive layer is 14° C.), the high temperature preservation reliability at 90° C. and 90% RH can be imparted to the recording medium.

Example 20

A polycarbonate substrate having a thickness of 1.2 mm, on which wobbling guide grooves having a width of 0.5 μm and a depth of 30 nm are formed was prepared by injection molding. On the substrate, a first protective layer, a recording layer, a second protective layer, a third protective layer, and a reflection layer were overlaid in this order by sputtering.

The first and second protective layers were made of ZnS.SiO$_2$ (80/20 by mole) and the thickness thereof was 80 nm and 11 nm, respectively.

The recording layer was made of $Ge_2Ga_7Sb_{70}Te_{20}Ti_1$ and the thickness thereof was 16 nm.

The third protective layer was a Si layer having a thickness of 4 nm.

The reflection layer is constituted of $Ag_{98}Cu_{1.5}Nd_{0.5}$ and has a thickness of 140 nm.

Thus, a multi-layered plate having the following constitution was prepared.

Polycarbonate substrate (1.2 mm)/ZnS.SiO$_2$ (80 nm)/
Ge$_2$Ga$_7$Sb$_{70}$Te$_{20}$Ti$_1$ (16 nm)/ZnS.SiO$_2$ (11 nm)/
Si (4 nm)/Ag$_{98}$Cu$_{1.5}$Nd$_{0.5}$ (140 nm)

Then an ultraviolet crosslinking resin (SD318 manufactured by Dainippon Ink & Chemicals Inc.) having a viscosity of 120 cps at room temperature was coated on the Ag-based reflection layer by spin coating and crosslinked to form an overcoat layer. The glass transition temperature and thickness of the crosslinked resin was 149° C. and 7 μm. Thus, an single-plate type optical recording medium was prepared.

The optical recording medium was initialized by an initializing apparatus having a large diameter laser diode (LD) (beam diameter of 200×1 μm) under conditions of 3.0 m/sec in linear speed and 850 mW in laser diode power, to crystallize the recording layer. The initialization was performed from the inside to the outside of the recording medium at a pitch of 100 μm while the linear speed is kept to be constant.

Then the recording medium was subjected to optical recording in CD-ROM reproducible format at a linear speed of 28.8 m/sec using an apparatus which emits laser light having a wavelength of 780 nm and which has a numerical aperture (NA) of 0.65 and a recording power of 25 mW.

As a result, the recorded signals had good data-to-clock jitter, i.e., 28 ns at 1.2 m/s reproduction, even after 1000-time direct overwriting (DOW). In addition, the recorded signals had good properties and the reflectance and modulation thereof were 19% and 60%, respectively. Namely, it can be said that the high reflectance and heat conductivity of a silver material used in the reflection layer can be fully utilized.

Even after this optical recording medium was subjected to a 500-hour preservation test at 90° C. and 90% RH, the reflectance and modulation were 19% and 63%, which were almost the same as those at the beginning of the preservation test.

In addition, C1 errors (correctable errors) after the preservation test were almost the same as those before the preservation test.

Namely, by forming an overcoat layer having a glass transition temperature of 149° C., the high temperature preservation reliability at 90° C. and 90% RH can be imparted to the recording medium.

EFFECT OF THE PRESENT INVENTION

According to the present invention, an optical recording medium is provided in which ionization of Ag and formation of voids in the Ag-based reflection layer therein can be prevented and the Ag-based reflection layer has good adhesion to the adjacent layers and which has high reliability even after preservation at high temperature and humidity conditions without deteriorating the high reflectance and high heat conductivity of Ag in the reflection layer and without largely influencing the optical properties and thermal properties of the recording medium.

In addition, by forming an overcoat layer (and/or an adhesive layer) having a glass transition temperature of from 90° C. to 180° C. on the Ag-based reflection layer, an optical recording medium having good reflectance and heat conductivity and good high-temperature preservation reliability can be produced. When the difference in glass transition temperature between the overcoat layer and adhesive layer is not greater than 50° C., the resultant recording layer can stably work even at a high temperature.

When the recording layer is constituted of a phase change material having a specific formula, the ability of the recording medium preventing corrosion of the Ag-based reflection layer can be further enhanced.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications No. 2002-062608, 2002-089736 and 2002-075052, filed on Mar. 7, 2002, Mar. 27, 2002 and Mar. 18, 2002, respectively, the entire contents of which are herein incorporated by reference.

What is claimed is:

1. An optical recording medium comprising:
    a substrate having a guide groove thereon;
    a first protective layer located overlying the substrate;
    a recording layer located overlying the first protective layer;
    a second protective layer located overlying the recording layer;
    a third protective layer located overlying the second protective layer and comprising Si in an amount not less than 35 atomic percent, said third protective layer having a thickness of from 2 nm to 9 nm; and
    a reflection layer located overlying the third protective layer and comprising Ag in an amount not less than 95% by weight.

2. The optical recording medium according to claim 1, further comprising:
    an overcoat layer located overlying the reflection layer.

3. The optical recording medium according to claim 1, further comprising:
    an adhesive layer located overlying the reflection layer; and
    either a second substrate or a second optical recording medium which is located overlying the adhesive layer.

4. The optical recording medium according to claim 1, wherein the thickness of the third protective layer is from 3 to 7 nm.

5. The optical recording medium according to claim 1, wherein the third protective layer consists essentially of Si.

6. The optical recording medium according to claim 1, wherein the third protective layer comprises Si, C and O.

7. The optical recording medium according to claim 6, wherein the third protective layer comprises SiC and SiOx, wherein x represents a number of from 1 to 2.

8. The optical recording medium according to claim 6, wherein the third protective layer comprises C, SiC and SiOx, wherein x represents a number of from 1 to 2.

9. The optical recording medium according to claim 6, wherein the third protective layer comprises O in an amount of from 1 to 20 atomic percent.

10. The optical recording medium according to claim 1, wherein the optical recording medium satisfies the following relationships:

$$0.1 \leq DM/D2 \leq 0.5, \text{ and } 0.01 \leq DM/DR \leq 0.1,$$

wherein D2 represents a thickness of the second protective layer, DM represents the thickness of the third protective layer, and DR represents a thickness of the reflection layer.

11. The optical recording medium according to claim 10, wherein the optical recording medium satisfies the following relationships:

$$0.15 \leq DM/D2 \leq 0.35, \text{ and } 0.03 \leq DM/DR \leq 0.05.$$

12. The optical recording medium according to claim 1, wherein the third protective layer has an average electronegativity En (ave) not greater than 2.3, wherein the average electronegativity En(ave) is represented by the following formula:

$$En(\text{ave}) = (\Sigma[mi \times Eni])/100$$

wherein mi and Eni represent an atomic percent and an electronegativity of each of constituent elements of the third protective layer, respectively.

13. The optical recording medium according to claim 2, wherein the overcoat layer has a glass transition temperature of from 90° C. to 180° C.

14. The optical recording medium according to claim 13, wherein the overcoat layer has a glass transition temperature of from 100° C. to 165° C.

15. The optical recording medium according to claim 3, wherein the adhesive layer has a glass transition temperature of from 90° C. to 180° C.

16. The optical recording medium according to claim 15, wherein the adhesive layer has a glass transition temperature of from 100° C. to 165° C.

17. The optical recording medium according to claim 3, further comprising:
    an overcoat layer located between the adhesive layer and the reflection layer,
    wherein the overcoat layer has a glass transition temperature Tg(1) of from 90° C. to 180° C., and the adhesive layer has a glass transition temperature Tg(2) of from 90° C. to 180° C., and wherein a difference between the glass transition temperatures Tg(1) and Tg(2) is not greater than 50° C.

18. The optical recording medium, according to claim 17, wherein the difference between the glass transition temperatures Tg(1) and Tg(2) is not greater than 30° C.

19. The optical recording medium according to claim 1, wherein the reflection layer further comprises an element selected from the group consisting of Al, Bi, Ca, Cu, Cd, Fe, Mn, Mg, Ni, Pd, Pb, Sb, Zn and Nd.

20. The optical recording medium according to claim 19, wherein the reflection layer comprises at least one of Cu and Nd.

21. The optical recording medium according to claim 20, wherein the reflection layer comprises Cu in an amount of from 0.1 to 5% by weight.

22. The optical recording medium according to claim 1, wherein the guide groove has a width of from 0.10 μm to 0.40 μm and a depth of from 15 nm to 45 nm.

23. The optical recording medium according to claim 22, wherein the guide groove has a width of from 0.15 μm to 0.35 μm and a depth of from 20 nm to 40 nm.

24. The optical recording medium according to claim 1, wherein the guide groove has a width of from 0.25 μm to 0.65 μm and a depth of from 20 nm to 50 nm.

25. The optical recording medium according to claim 24, wherein the guide groove has a width of from 0.30 μm to 0.60 μm and a depth of from 25 nm to 45 nm.

26. The optical recording medium according to claim 1, wherein the recording layer has a formula $Ag_{\alpha 1}Ge_{\alpha 2}In_{\beta 1}Ga_{\beta 2}Bi_{\beta 3}Sb_\gamma Te_\delta M_\epsilon$, wherein $\alpha 1+\alpha 2+\beta 1+\beta 2+\beta 3+\gamma+\delta+\epsilon=100$ atomic percent, and wherein $0 \leq \alpha 1 \leq 10$, $0 \leq \alpha 2 \leq 10$, $0.1 \leq \alpha 1+\alpha 2 \leq 10$, $0 \leq \beta 1 \leq 15$, $0 \leq \beta 2 \leq 15$, $0 \leq \beta 3 \leq 15$, $1 \leq \beta 1+\beta 2+\beta 3 \leq 15$, $60 \leq \gamma \leq 90$, $15 \leq \delta \leq 30$, and $0 \leq \epsilon \leq 10$.

27. An optical recording medium comprising:
a substrate having a guide groove thereon;
a recording layer located overlying the substrate;
a reflection layer located overlying the recording layer and comprising Ag in an amount not less than 95% by weight;
an adhesive layer located overlying the reflection layer and having a glass transition temperature Tg(2) of from 90° C. to 180° C.;
either a second substrate or a second optical recording medium which is located overlying the adhesive layer; and
an overcoat layer located between the reflection layer and the adhesive layer,
wherein the overcoat layer has a glass transition temperature Tg(1), and wherein a difference between the glass transition temperatures Tg(1) and Tg(2) is not greater than 50° C.

28. An optical recording medium comprising:
a substrate having a guide groove thereon;
a recording layer located overlying the substrate;
a reflection layer located overlying the recording layer and comprising Ag in an amount not less than 95% by weight; and
an overcoat layer located overlying the reflection layer and having a glass transition temperature Tg(1) of from 90° C. to 180° C.,
wherein the recording layer has a formula $Ag_{\alpha 1}Ge_{\alpha 2}In_{\beta 1}Ga_{\beta 2}Bi_{\beta 3}Sb_\gamma Te_\delta M_\epsilon$, wherein $\alpha 1+\alpha 2+\beta 1+\beta 2+\beta 3+\gamma+\delta+\epsilon=100$ atomic percent, and wherein $0 \leq \alpha 1 \leq 10$, $0 \leq \alpha 2 \leq 10$, $0.1 \leq \alpha 1+\alpha 2 \leq 10$, $0 \leq \beta 1 \leq 15$, $0 \leq \beta 2 \leq 15$, $0 \leq \beta 3 \leq 15$, $1 \leq \beta 1+\beta 2+\beta 3 \leq 15$, $60 \leq \gamma \leq 90$, $15 \leq \delta \leq 30$, and $0 \leq \epsilon \leq 10$.

29. An optical recording medium comprising:
a substrate having a guide groove thereon;
a recording layer located overlying the substrate;
a reflection layer located overlying the recording layer and comprising Ag in an amount not less than 95% by weight;
an adhesive layer located overlying the reflection layer and having a glass transition temperature Tg(2) of from 90° C. to 180° C.; and
either a second substrate or a second optical recording medium which is located overlying the adhesive layer, wherein the recording layer has a formula $Ag_{\alpha 1}Ge_{\alpha 2}In_{\beta 1}Ga_{\beta 2}Bi_{\beta 3}Sb_\gamma Te_\delta M_\epsilon$, wherein $\alpha 1+\alpha 2+\beta 1+\beta 2+\beta 3+\gamma+\delta+\epsilon=100$ atomic percent, and wherein $0 \leq \alpha 1 \leq 10$, $0 \leq \alpha 2 \leq 10$, $0.1 \leq \alpha 1+\alpha 2 \leq 10$, $0 \leq \beta 1 \leq 15$, $0 \leq \beta 2 \leq 15$, $0 \leq \beta 3 \leq 15$, $1 \leq \beta 1+\beta 2+\beta 3 \leq 15$, $60 \leq \gamma \leq 90$, $15 \leq \delta \leq 30$, and $0 \leq \epsilon \leq 10$.

30. A method for manufacturing an optical recording medium comprising:
forming a first protective layer overlying a substrate;
forming a recording layer overlying the first protective layer;
forming a second protective layer overlying the recording layer;
forming a third protective layer comprising Si in an amount not less than 35 atomic percent overlying the second protective layer at a film forming speed Rm; and
forming a reflection layer comprising Ag in an amount not less than 95% by weight overlying the third protective layer at a film forming speed Rr,
wherein the following relationships are satisfied:

$$0.02 \leq Rm/Rr \leq 0.20, \text{ and } 0.5 \text{ nm/sec} \leq Rm \leq 5.0 \text{ nm/sec}.$$

31. The method according to claim 30, wherein the third protective layer and the reflection layer are formed by sputtering, and wherein the following relationship is satisfied:

$$1.5 \times Pm \leq Pr,$$

wherein Pm represents a sputtering power applied for forming the third protective layer, and Pr represents a sputtering power applied for forming the reflection layer.

32. The method according to claim 31, wherein the third protective layer is formed using a mixture of SiC and SiOx as a sputtering target.

33. The method according to claim 31, wherein the third protective layer is formed by a reaction sputtering method using SiC as a sputtering target and using a mixture gas of Ar with at least one of oxygen, carbon monoxide, and carbon dioxide.

* * * * *